United States Patent
Kerofsky et al.

(10) Patent No.: US 8,761,539 B2
(45) Date of Patent: Jun. 24, 2014

(54) SYSTEM FOR HIGH AMBIENT IMAGE ENHANCEMENT

(75) Inventors: Louis Joseph Kerofsky, Camas, WA (US); Xinyu Xu, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 70 days.

(21) Appl. No.: 13/545,457

(22) Filed: Jul. 10, 2012

(65) Prior Publication Data

US 2014/0016880 A1    Jan. 16, 2014

(51) Int. Cl.
*G06K 9/40*    (2006.01)

(52) U.S. Cl.
USPC ............ 382/274; 382/232; 382/162; 382/167

(58) Field of Classification Search
CPC ....................................... G06T 5/003
USPC .......................... 382/162, 167, 232, 233, 274
See application file for complete search history.

(56) References Cited

U.S. PATENT DOCUMENTS

| | | | |
|---|---|---|---|
| 6,317,521 B1 | 11/2001 | Gallagher et al. | |
| 6,762,742 B2 | 7/2004 | Moon et al. | |
| 7,079,281 B1 | 7/2006 | Ng et al. | |
| 7,110,062 B1 | 9/2006 | Whitted et al. | |
| 7,352,410 B2 | 4/2008 | Chou | |
| 7,391,906 B2 | 6/2008 | Blake et al. | |
| 7,460,103 B2 | 12/2008 | Konno et al. | |
| 7,515,160 B2 | 4/2009 | Kerofsky | |
| 2006/0020203 A1 | 1/2006 | Tamura | |
| 2006/0050783 A1 | 3/2006 | Le Dinh et al. | |
| 2006/0209005 A1 | 9/2006 | Pedram et al. | |
| 2007/0279372 A1* | 12/2007 | Elliott et al. | 345/102 |
| 2008/0084524 A1* | 4/2008 | Inuzuka et al. | 349/108 |
| 2009/0027410 A1* | 1/2009 | Inuzuka | 345/555 |
| 2010/0039414 A1 | 2/2010 | Bell | |
| 2010/0098339 A1 | 4/2010 | Kido | |
| 2011/0115815 A1 | 5/2011 | Xu et al. | |
| 2012/0287144 A1* | 11/2012 | Gandhi et al. | 345/589 |

FOREIGN PATENT DOCUMENTS

JP    2004357243 A    12/2004

OTHER PUBLICATIONS

Mantiuk, "Display adaptive tone mapping," ACM Trans. Graph. 27, 3 (2008).
Jong-Man Kim et al., "Illuminant Adaptive Color Reproduction Based on Lightness Adaptation and Flare for Mobile Phone," ICIP 2006, pp. 1513-1516.
Kerofsky "LCD Backlight Selection through Distortion Minimization," IDW-2007, 4 pgs.

* cited by examiner

*Primary Examiner* — Ali Bayat
(74) *Attorney, Agent, or Firm* — Chernoff Vilhauer McClung & Stenzel, LLP

(57) ABSTRACT

A system for improving content visibility on a display under low-contrast viewing conditions using an image process technique.

13 Claims, 21 Drawing Sheets

SYSTEM FOR HIGH AMBIENT IMAGE ENHANCEMENT

FIELD OF THE INVENTION

The present invention relates generally to image enhancement.

BACKGROUND

Low-contrast viewing conditions may negatively impact, for example, through eyestrain and fatigue, the viewing experience of a user of an LCD device, for example, a LCD television, a LCD mobile device and other devices comprising a LCD display.

Low-contrast viewing conditions may arise when a device is used in an aggressive power-reduction mode, wherein the LCD backlight power level may be dramatically reduced making the image/video content appear dark and less visible to a viewer. The contrast of the image/video may be vastly reduced, or in some cases, pegged at black, and many image features that may convey important scene content may fall below the visible threshold.

Low-contrast viewing conditions may also arise when a LCD display is viewed under high ambient light, for example, direct sunlight. In these situations, the minimum display brightness that a viewer may perceive may be elevated due to the high ambient light in the surroundings. The image/video may appear "washed out" where it is intended to be bright, and the image/video may appear featureless in darker regions.

For both of the above-described low-contrast viewing scenarios, and other low-contrast viewing scenarios, the tonal dynamic range of the image/video may be compressed and the image contrast may be greatly reduced, thereby degrading the viewing experience of the user. Due to increasing consumer concern for reduced energy costs and demand for device mobility, it may be desirable to provide improved digital imagery and video quality to enhance the viewing experience under low-contrast viewing conditions.

BRIEF DESCRIPTION OF THE SEVERAL DRAWINGS

DETAILED DESCRIPTION OF EXEMPLARY EMBODIMENTS

Low-contrast viewing conditions may negatively impact, for example, through eyestrain and fatigue, the viewing experience of a user of a LCD device, for example, a LCD television, a LCD mobile device and other devices comprising a LCD display.

Figure 1:
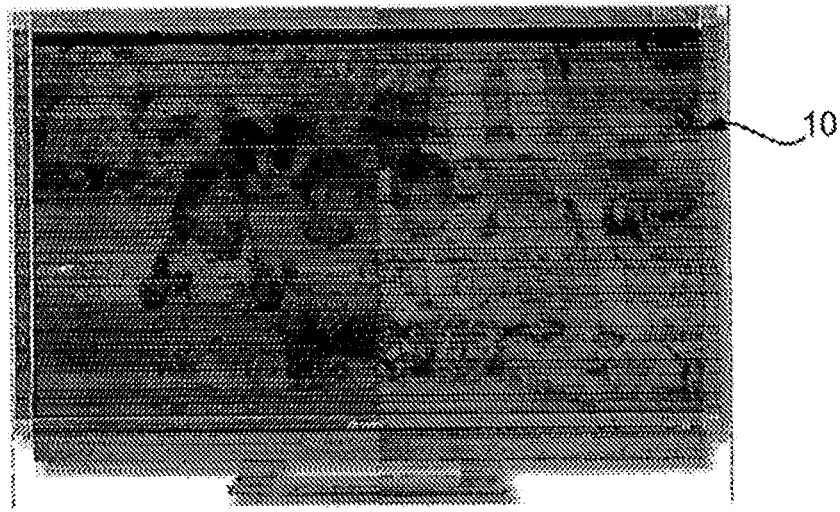
FIG. 1 is a picture depicting an exemplary image under a low back-light-power viewing condition.

Low-contrast viewing conditions may arise when a device is used in an aggressive power-reduction mode, wherein the LCD backlight power level may be dramatically reduced making the image/video content appear dark and less visible to a viewer. The contrast of the image/video may be vastly reduced, or in some cases, pegged at black, and many image features that may convey important scene content may fall below the visible threshold. FIG. 1 depicts an exemplary image 10 displayed on a device operating under aggressive power-mode reduction.

Figure 2:
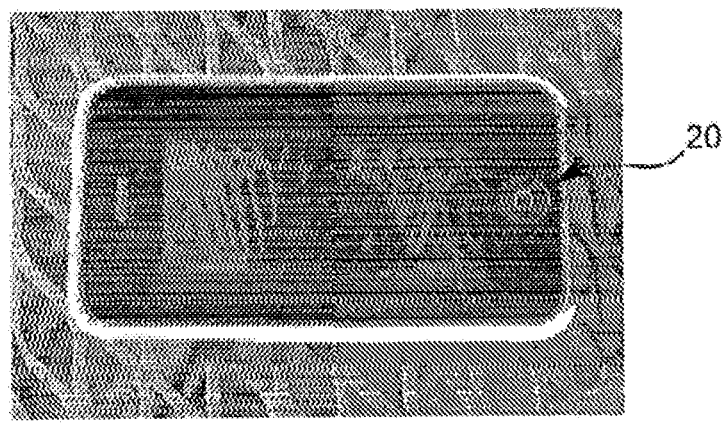
FIG. 2 is a picture depicting an exemplary image under a high ambient-light viewing condition.

Low-contrast viewing conditions may also arise when a LCD display is viewed under high ambient light, for example, direct sunlight. In these situations, the minimum display brightness that a viewer may perceive may be elevated due to the high ambient light in the surroundings. The image/video may appear "washed out" where it is intended to be bright, and the image/video may appear featureless in darker regions. FIG. 2 depicts an exemplary image 20 viewed with a mobile phone under high ambient lighting (direct sunlight).

For both of the above-described low-contrast viewing scenarios, and other low-contrast viewing scenarios, the tonal dynamic range of the image/video may be compressed and the image contrast may be greatly reduced, thereby degrading the viewing experience of the user. Due to increasing consumer concern for reduced energy costs and demand for device mobility, it may be desirable to provide improved digital imagery and video quality to enhance the viewing experience under low-contrast viewing conditions.

Figure 3:
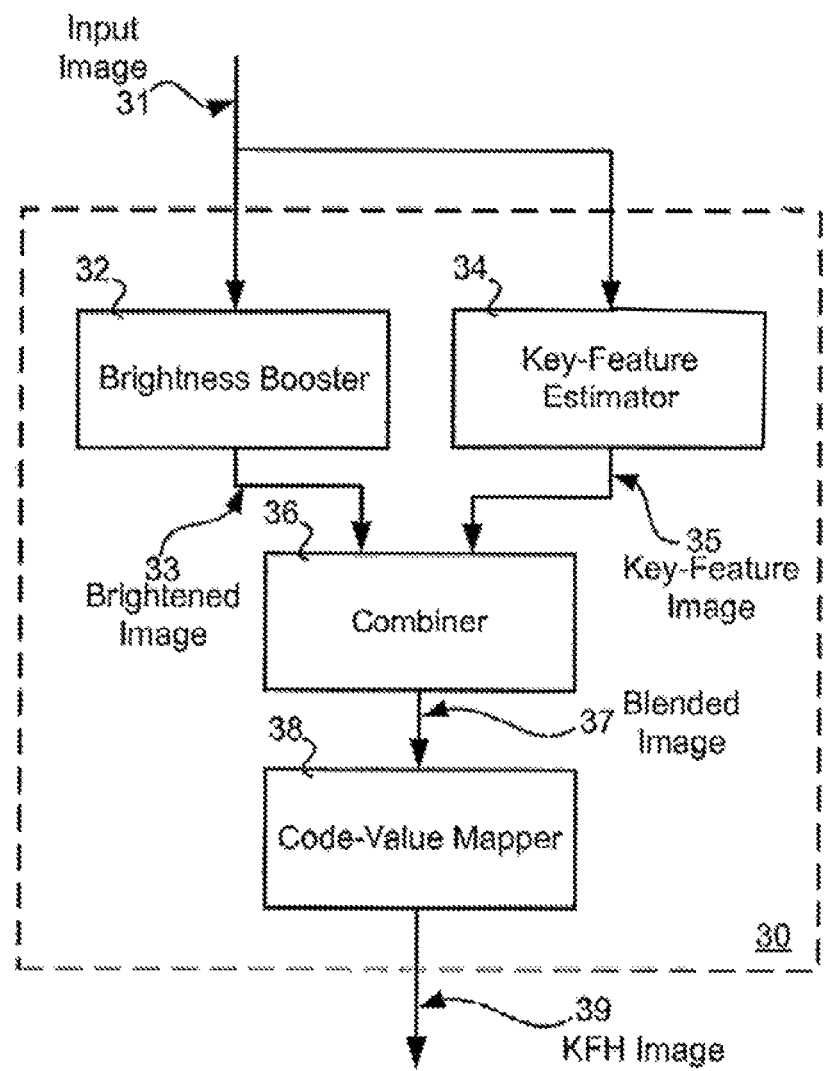
FIG. 3 is a chart showing a brightness booster for boosting the brightness level of an input image, a key-feature estimator for estimating a key-feature map associated with the input image and a combiner for combining the brightness-boosted image and the key-feature map.

Referring to FIG. 3 to increase the visibility of image/video features in low-contrast viewing conditions by highlighting key image features with Non-Photorealistic Rendering (NPR) techniques. This may include an image-enhancement system 30 comprising a brightness booster 32, a key-feature estimator 34, a combiner 36 and a code-value mapper 38. The image-enhancement system 30 may receive an input image 31 and may make the input image 31 available to the brightness booster 32 and the key-feature estimator 34. The input image 31 may be a color image, for example, an RGB image. The input image 31 may be a gray-scale image. The input image 31 may be a still image or a frame of a video sequence.

The brightness booster 32 may boost the brightness of the input image 31 using a brightness preservation technique, and the brightness booster 32 may generate a brightened image 33 that may be made available to the combiner 36. The brightness booster 32 may boost the brightness of the input image 31 based on information related to a LCD backlight associated with a LCD display on which the enhanced image may be displayed.

The key-feature estimator 34 may estimate a key-feature image 35, also referred to as a key-feature map, from the input image 31 and may make the key-feature image 35 available to the combiner 36.

The combiner 36 may blend the brightened image 33 and the key-feature image 35 to form a blended image 37 which may be made available to the code-value mapper 38. The code-value mapper 38 may form a key-feature-highlighted (KFH) image 39 by mapping the code-values generated by the combiner 36 into code values appropriate for a LCD, for example, to the range of [0,255]. The KFH image 39 may be made directly available to the LCD for display. The KFH image 39 may also be referred to as an NPR image.

Figure 4:
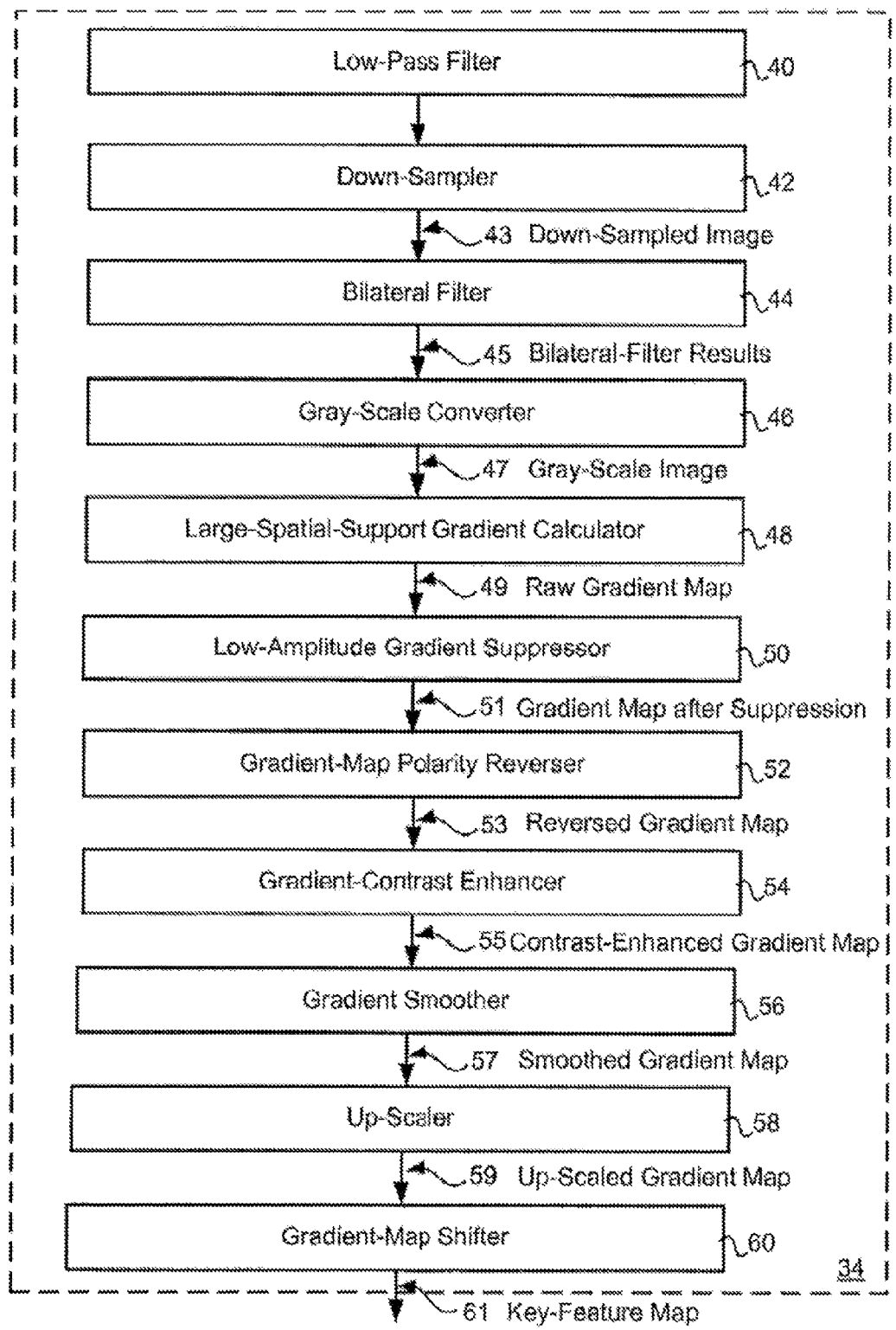
FIG. 4 is a chart showing a gradient estimator comprising a large-spatial-support gradient calculator.

Referring to FIG. 4, the key-feature estimator 34 may comprise a low-pass filter 40 and a down-sampler 42 for reducing, if necessary, the resolution of the input image to a resolution that may allow near real-time processing. Exemplary low-pass filters may include neighborhood pixel-value averaging, Gaussian smoothing, median blur filtering and other low-pass filters known in the art. A low-pass filter may be selected based on computational limitations and/or system resources. Exemplary down-samplers may comprise removal of image rows, removal of image columns, bilinear image resizing, bicubic image resizing, Gaussian pyramid down-samplers and other down-samplers. A down-sampler may be selected based on computational limitations and/or system resources. A key-feature estimator may not reduce the resolution of the input image, and may, therefore, not comprise a low-pass filter and a down-sampler.

The down-sampled image 43 may be made available to a bilateral filter 44 which may smooth less-textured areas. Major contours of objects within an image may convey important image information, while less-textured areas may be perceptually less important to a viewer. Thus bilateral filtering may be used to remove unnecessary gradient information, while retaining key edge information corresponding to object contours.

The results 45 of the bilateral filtering may be converted to gray-scale values by a gray-scale converter 46, and gradient estimation may be performed on the gray-scale image 47 by a large-spatial-support gradient calculator 48. Commonly used edge detectors, for example, the Sobel operator, the Canny edge detector and the Laplacian operator, may not effectively detect edges associated with major contours. Use of these common edge detectors may result in broken lines on major object contours. Additionally, minor edges may be detected in less-textured image areas, which may not be desirable in KFH rendering. Further, object boundaries in a gradient map generated using one of the commonly used edge detectors may not be well defined. The system may compute image gradients using a large spatial support and may retain, as edge pixels, only pixels with a large gradient value.

The large-spatial-support gradient calculator 48 may comprise a horizontal-gradient calculator and a vertical-gradient calculator. At each pixel in the gray-scale image 47, a horizontal-gradient value may be determined by the horizontal-gradient calculator and a vertical-gradient value may be determined by the vertical-gradient calculator. A gradient value may be assigned to a pixel based on the determined horizontal-gradient value and the determined vertical-gradient value associated with the pixel. The gradient value assigned to a pixel may be the largest of the horizontal-gradient value and the vertical-gradient value associated with the pixel.

Figure 5:
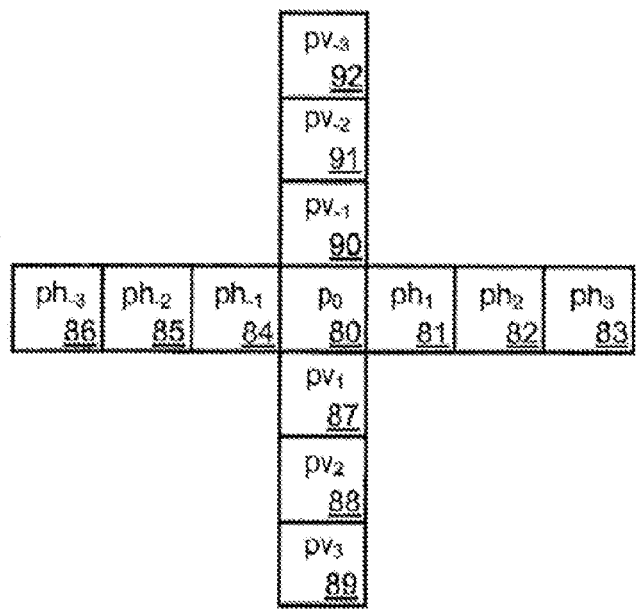
FIG. 5 is a picture depicting an exemplary large-spatial support, associated with a pixel location, used in a gradient calculation.

The horizontal-gradient value associated with a pixel may be determined by computing a first-order derivative at the pixel with respect to several horizontal neighbors in each direction, to the left and to the right, of the pixel. The largest derivative value in each direction may be added together to form the horizontal-gradient value associated with the pixel. Similarly, the vertical-gradient value associated with a pixel may be determined by computing a first-order derivative at the pixel with respect to several vertical neighbors in each direction, above and below, the pixel. The largest derivative value in each direction may be added together to form the vertical-gradient value associated with the pixel. The size of the one-dimensional search window associated with a direction (left, right, above, below) may be three pixels. FIG. 5 illustrates the large spatial support for an exemplary embodiment in which the one-dimension search window is three pixels. For a pixel denoted $p_0$ 80, the horizontal-gradient value, $\text{grad}_H(p_0)$, may be determined according to:

$$\text{grad}_H(p_0) = \max[D^1(p_0, ph_1), D^1(p_0, ph_2), D^1(p_0, ph_3)] + \max[D^1(p_0, ph_{-1}), D^1(p_0, ph_{-1}), D^1(p_0, ph_{-2}), D^1(p_0, ph_{-3})]$$

and the vertical-gradient value, $\text{grad}_V(p_0)$, may be determined according to:

$$\text{grad}_V(p_0) = \max[D^1(p_0, pv_1), D^1(p_0, pv_2), D^1(p_0, pv_3)] + \max[D^1(p_0, pv_{-1}), D^1(p_0, pv_{-1}), D^1(p_0, pv_{-2}), D^1(p_0, pv_{-3})]$$

where $D^1(\bullet,\bullet)$ may denote the first-order derivative and $ph_1$ 81, $ph_2$ 82 and $ph_3$ 83 are the pixels in the one-dimensional search window to the right of the pixel $p_0$ 80, $ph_{-1}$ 84, $ph_{-2}$ 85 and $ph_{-3}$ 86 are the pixels in the one-dimensional search window to the left of the pixel $p_0$ 80, $pv_1$ 87, $pv_2$ 88 and $pv_3$ 89 are the pixels in the one-dimensional search window below the pixel $p_0$ 80 and $pv_{-1}$ 90, $pv_{-2}$ 91 and $pv_{-3}$ 92 are the pixels in the one-dimensional search window above the pixel $p_0$ 80. The final raw gradient value, grad($p_0$), associated with the pixel $p_0$ 80 may be determined according to:

$$grad(p_0) = \max[grad_H(p_0), grad_V(p_0)]$$

thereby producing a raw gradient map 49.

Figure 6:
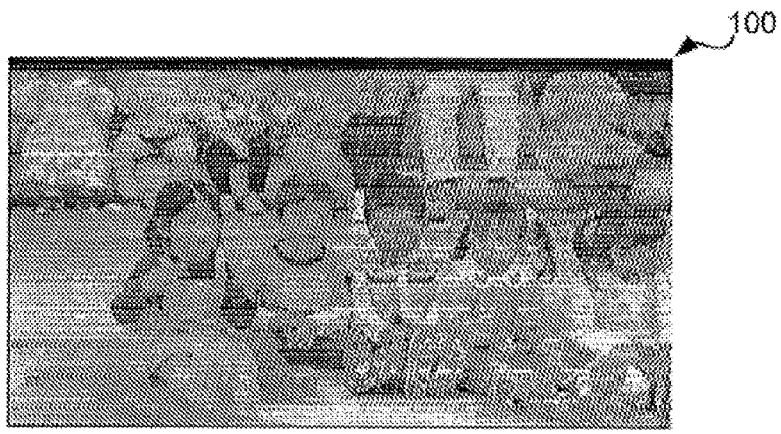
FIG. 6 is a picture depicting an input image.
Figure 7:
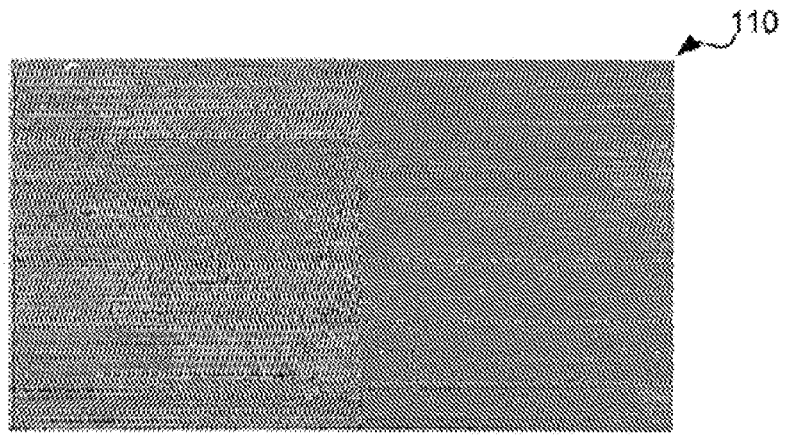
FIG. 7 is a picture depicting a raw gradient map for the exemplary input image shown in FIG. 6.

FIG. 6 shows an exemplary image 100, and FIG. 7 shows the resulting raw gradient map 110 for the exemplary image 100 shown in FIG. 6, using a three-pixel search window.

Figure 8:
FIG. 8 is a picture depicting a gradient map after suppressing low-amplitude gradients in the raw gradient map shown in FIG. 7.

The raw gradient map 49 may contain noisy details. Therefore, the raw gradient map 49 may be made available to a low-amplitude gradient suppressor 50 which may remove low-amplitude gradients. The low-amplitude gradient suppressor 50 may comprise a comparator that compares the gradient amplitude to a threshold according to:

$$grad_{suppress}(p_0) = \begin{cases} grad(p_0), & grad(p_0) > T \\ 0, & \text{otherwise,} \end{cases}$$

where T may denote a threshold and $grad_{suppress}(p_0)$ may denote the low-amplitude-gradient-suppressed gradient map. The threshold may be set to T=5.0. The low-amplitude gradient suppressor 50 may comprise a zero-crossing detector, and pixel locations associated with zero-crossings may be retained in the gradient map, while non-zero-crossings may be suppressed. FIG. 8 shows the resulting gradient map 120 after suppressing low-amplitude gradients, by thresholding, in the raw gradient map 110 shown in FIG. 7.

Figure 9:
FIG. 9 is a picture depicting a reversed gradient map generated by polarity reversion applied to the exemplary gradient map shown in FIG. 8.

The low-amplitude-gradient-suppressed gradient map 51 may be made available to a gradient-map polarity reverser 52 that may reverse the gradient polarity according to:

$$grad_{rev}(p_0) = \text{offset} - grad_{suppress}(p_0),$$

where offset may denote an offset parameter that may be associated with white background and $grad_{rev}(p_0)$ may denote the reversed gradient map. The parameter offset may be determined empirically, such as offset=120. FIG. 9 shows the outcome 130 of polarity reversion applied to the exemplary gradient map 120 shown in FIG. 8.

The reversed gradient map 53 may be made available to a gradient-contrast enhancer 54 that may improve the contrast of the reversed gradient map 53 and may map the gradient values to the range of 0 to 255. The gradient-contrast enhancer 54 may map the reversed gradient values according to:

$$grad_{enhanced}(p_0) = \begin{cases} 255, & grad_{rev}(p_0) = \text{offset} \\ 0, & grad_{rev}(p_0) \leq 0 \\ grad_{rev}(p_0) + \text{shift}, & 0 < grad_{rev}(p_0) < \text{offset,} \end{cases}$$

where shift may denote a contrast shift and $grad_{enhanced}(p_0)$ may denote the contrast-enhanced gradient map. The parameter shift may be determined empirically, such as shift=120.

The gradient-contrast enhancer 54 may produce a binary gradient map according to:

$$grad_{enhanced}(p_0) = \begin{cases} 255, & grad_{rev}(p_0) = \text{offset} \\ 0, & grad_{rev}(p_0) < \text{offset.} \end{cases}$$

Figure 10:
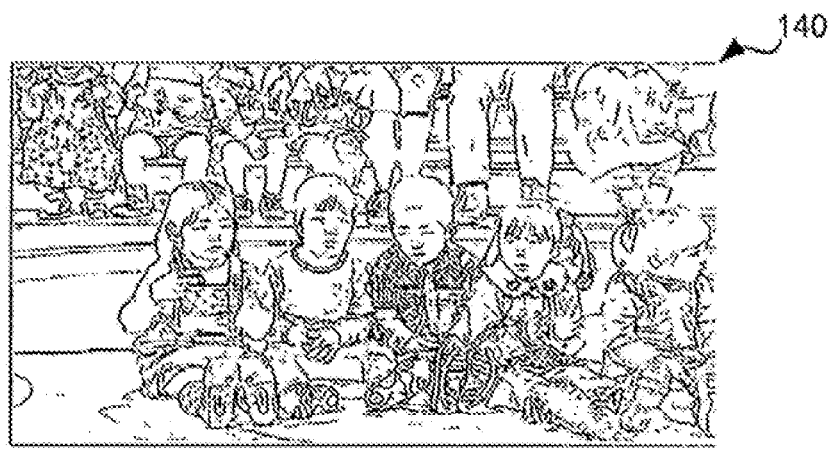
FIG. 10 is a picture depicting a contrast-enhanced gradient map associated with the reversed gradient map shown in FIG. 9.

FIG. 10 shows the outcome 140 of gradient-contrast enhancement applied to the exemplary reversed gradient map 130 shown in FIG. 9.

Figure 11:
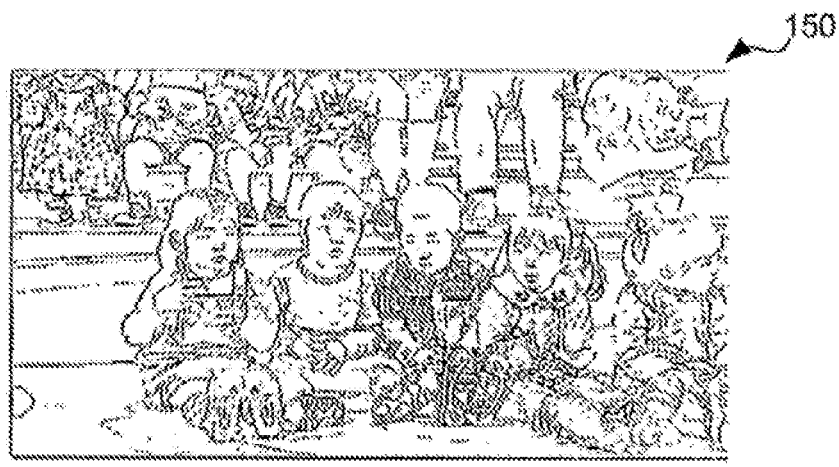
FIG. 11 is a picture depicting the effect of gradient smoothing applied to the contrast-enhanced gradient map shown in FIG. 10.

The contrasted-enhanced gradient map 55 may be made available to a gradient smoother 56 that may blur the boundary between foreground edges and white background and may link broken lines. The gradient smoother 56 may comprise a Gaussian low-pass filter. The kernel size of the Gaussian low-pass filter may be 3×3. FIG. 11 shows the effect 150 of gradient smoothing applied to the exemplary contrast-enhanced gradient map 140 shown in FIG. 10.

The smoothed gradient map 57 may be made available to an up-scaler 58 that may scale the smoothed gradient map 57 to the original input image resolution. The up-scaled gradient map 59 may be made available to a gradient-map shifter 60 that may shift the background of the gradient map to zero. The gradient-map shifter 60 may subtract 255 from the up-scaled gradient values to shift the background to zero. The resulting key-feature map 61 may be made available from the key-feature estimator 34 to the combiner 36.

Referring to FIG. 3, the brightness booster 32 may boost the brightness of the input image 31 using a linear scaling factor, also referred to as a scaling factor, a boosting factor, a brightening factor and a brightness-boosting factor. The linear scaling factor may be determined such that the brightness is preserved under a predetermined percentage of backlight dimming according to:

$$S = \left(\frac{1}{BL_{reduced}}\right)^{\frac{1}{\gamma}},$$

where S may denote the scaling factor, $BL_{reduced}$ may denote the percentage of backlight dimming and $\gamma$ may denote the LCD system gamma. $BL_{reduced}$ may be a predetermined fixed percentage, for example, 15 percent. The scaling factor, S, may be determined adaptively based on image content. The scaling factor, S, may be computed using the color histogram of the input image. The percentage of backlight dimming, $BL_{reduced}$, may be determined as desired. For example, the percentage of backlight dimming, $BL_{reduced}$, may be determined according to the methods and systems disclosed in U.S. patent application Ser. No. 11/465,436, entitled "Systems and Methods for Selecting a Display Source Light Illumination Level," filed Aug. 17, 2006, which is hereby incorporated by reference herein in its entirety.

Figure 12:
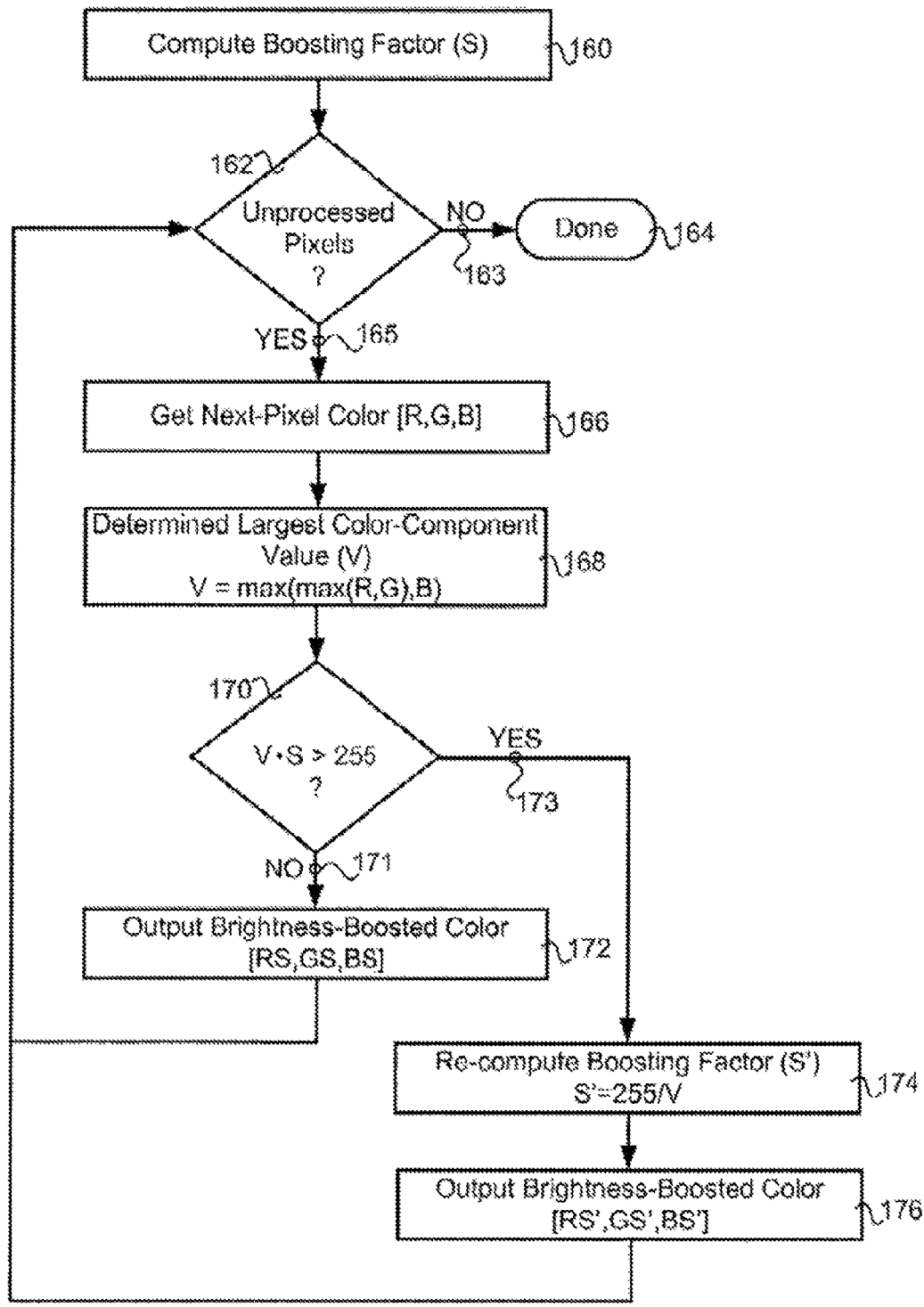
FIG. 12 is a chart showing a brightness-boosting factor that maintains the color ratio across three color channels when clipping occurs.

To reduce a clipping problem, the brightness boosting may comprise per-pixel processing described in relation to FIG. 12. The boosting factor, S, may be computed 160, and a determination 162 may be made as to whether or not there are unprocessed pixels. If there are no 163 unprocessed pixels; then the brightness boosting procedure may terminate 164. If there are 165 unprocessed pixels, then the color-component values, denoted [R, G, B] of the next pixel may be obtained 166. The largest color-component value, which may be denoted V, may be determined 168. V may be determined according to:

$$V = \max(\max(R, G), B).$$

The largest color-component value, V, may be scaled by the boosting factor, S, and the scaled value may be compared 170 to the maximum code value. The maximum code value may be 255. If the scaled value is less than or equal to 171 the maximum code value, the color value associated with the current pixel may be brightness boosted using the scale value, S, and the brightness-boosted color value may be output 172 for the current pixel. A determination 162 may be made as to whether or not there are unprocessed pixels, and the process may continue. If the scaled value is greater than 173 the maximum code value, then the boosting factor may be re-computed according to:

$$S' = \frac{255}{V},$$

where S' may denote the re-computed boosting factor. The color value associated with the current pixel may be brightness boosted using the re-computed boosting factor, S', and the brightness-boosted color value may be output 176 for the current pixel. A determination 162 may be made as to whether or not there are unprocessed pixels, and the process may continue. The color ratio across the three color channels is maintained when clipping occurs, and thus color fidelity is maintained.

A common brightening factor, S, may be used at each pixel, with the exception of pixels for which clipping occurs. Te brightening factor, S, may be spatially varying according to image content. The brightening factor, S, may be determined according to:

$$S(x, y) = \left(\alpha + \exp\left(-\frac{f(x, y)^2}{\sigma^2}\right)\right),$$
$$\alpha \geq 1,$$

where f(x,y) may be the image brightness at location (x,y), α may be a parameter that controls the range of the brightening factor and σ may be a factor that controls the shape of the Gaussian weighting function. For f(x,y) with a range of [0,255], exemplary parameter values of α and σ are 1.6 and 100, respectively. The Gaussian weighting function may produce a larger boosting factor, S(x,y), when the brightness f(x,y) is low. Therefore, a pixel with a low-brightness value may be more heavily brightened than a pixel with a larger brightness value.

The image brightness values may be quantized into a plurality of brightness-value bins, and a brightening factor may be associated with each brightness-value bin. Pixels with brightness values within the same brightness-value bin may be brightened by the same factor, the brightening factor associated with the respective bin. The quantization may be based on a histogram of the brightness values.

RGB input values may be convened to an alternative color space, for example, a luminance-chrominance-chrominance color space. Exemplary luminance-chrominance-chrominance color spaces may include YCbCr, YUV, Lab and other luminance-chrominance-chrominance color spaces. The luminance channel may be brightness boosted while the chrominance channels remain unchanged.

The brightened image 33 generated by the brightness booster 32 and the key-feature image 35 generated by the key-feature estimator 34 may be combined by the combiner 36. The combiner 36 may combine the brightened image 33 and the key-feature image 35 by adding the two images. The combiner 36 may blend the images using a weighted average of the two images according to:

$$I_{KFH} = \beta I_{boosted} + (1-\beta) I_{KFM},$$

where β may denote a blending factor, also referred to as a blending parameter, $I_{KFH}$ may denote the blended image 37, $I_{boosted}$ may denote the brightened image 33 generated by the brightness booster 32 and $I_{KFM}$ may denote the key-feature image 35 generated by the key-feature estimator 34. The blending factor, β, may be a user selected parameter. In alternative embodiments of the present invention, the blending factor, β, may be a pre-defined value.

The blended image 37 values may be mapped by a code-value mapper 38 to the range of display code values. The range of display code values is [0,255]. The resulting KFH image 39 may be made available from the image-enhancement system 30 to an LCD display.

Figure 13:
FIG. 13 is a picture depicting a Non-Photorealistic Rendering (NPR) rendition of the input image at full power consumption, shown in FIG. 6.
Figure 14:
FIG. 14 is a picture depicting an NPR rendition of the exemplary input image, at 2% power consumption, shown in FIG. 6.
Figure 15:
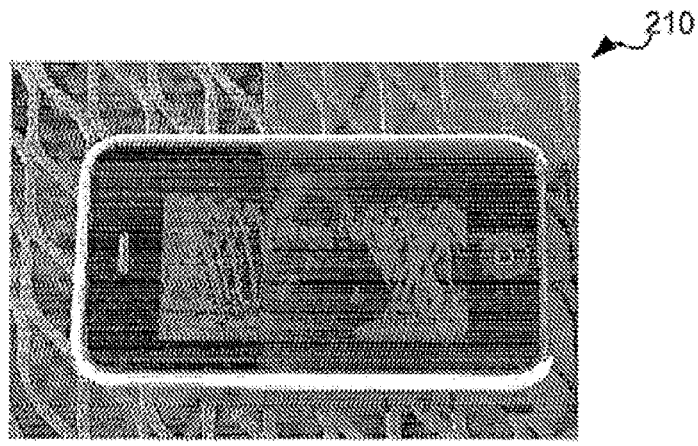
FIG. 15 is a picture depicting an NPR rendition of the exemplary input image, viewed in direct sunlight, shown in FIG. 2.

FIG. 13 depicts the NPR rendition 190 of the input image 100, at full power consumption, shown in FIG. 6. FIG. 14 depicts the NPR rendition 200 of the input image 100, at 2% power consumption, shown in FIG. 6. FIG. 15 depicts the NPR rendition 210 of the input image 20; viewed in direct sunlight, shown in FIG. 2.

Figure 16:
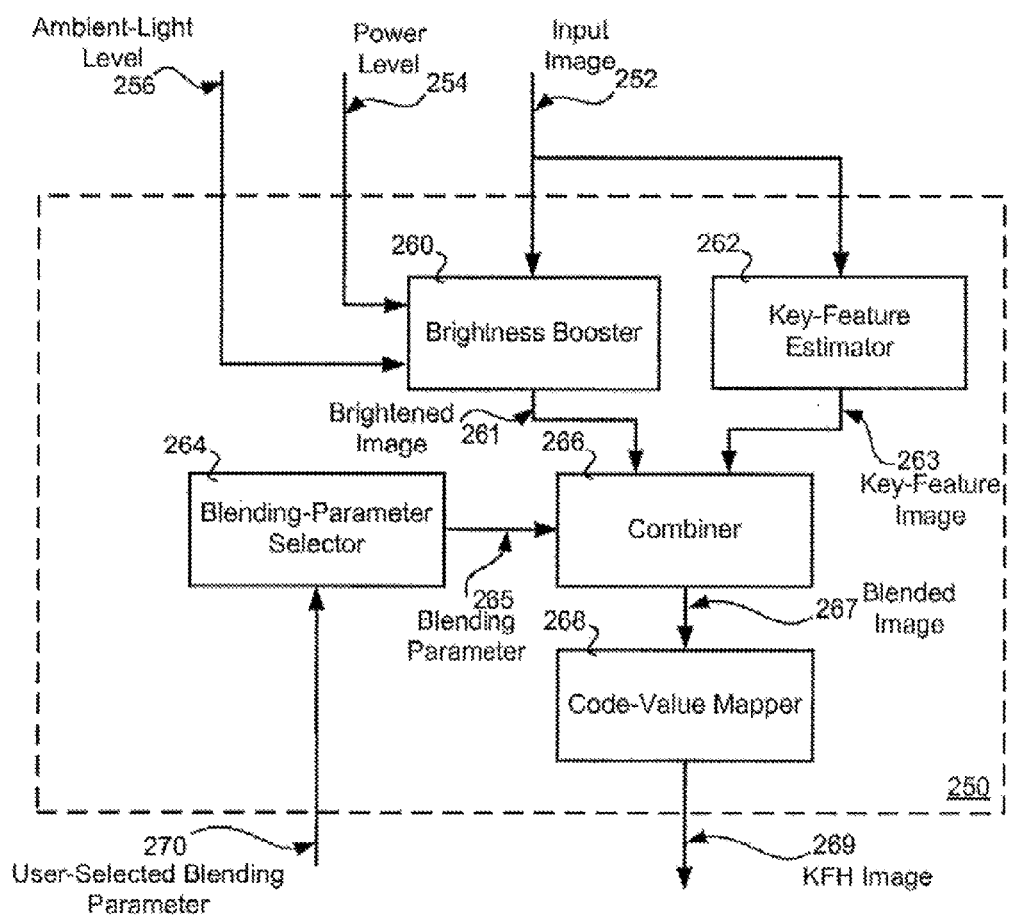
FIG. 16 is a chart showing a brightness booster for boosting the brightness level of an input image, a key-feature estimator for estimating a key-feature map associated with the input image, a combiner for combining the brightness-boosted image and the key-feature map and a blending-parameter selector for determining a blending parameter that is used by the combiner.

Referring to FIG. 16, the system may comprise a brightness booster 260, a key-feature estimator 262, a blending-parameter selector 264, a combiner 266 and a code-value mapper 268. An input image 252, a backlight power level 254 and an ambient-light level 256 may be received by the image-enhancement system 250. The input image may be a color image or a gray-scale image. The input image 252 may be made available to the brightness booster 260 and the key-feature estimator 262. The backlight power level 254 and the ambient-light level 256 may be made available to the brightness booster 260.

The key-feature estimator 262 may produce a key-feature image 263, also considered a key-feature map, associated with the input image 252. The key-feature estimator 262 may generate the key-feature map 263.

The brightness booster 260 may generate a brightened image 261 based on the input image 252 content, the backlight power level 254 and the ambient-light level 256.

The blending-parameter selector 264 may determine the blending parameter 265 used by the combiner 266 to blend the brightened image 261 and the gradient map 263. A user-selected blending parameter 270 may be provided to the blending-parameter selector 264. The user-selected blending parameter 270 may correspond directly to the blending parameter 265. The user-selected blending parameter 270 may be an image-quality setting selected by a user and associated with a blending parameter 265 value by the blending-parameter selector 264. The blending-parameter selector 264 may select a default value for the blending parameter 265 when a user-selected blending parameter 270 is not available.

The combiner 266 may combine the key-feature image 263 and the brightened image 261 based on the blending parameter 265. The combiner 266 may linearly blend the key-feature image 263 and the brightened image 261 using the blending parameter 265 as a weighting factor according to:

$$I_{KFH} = \beta I_{boosted} + (1-\beta) I_{KFM},$$

where β may denote the blending parameter 265, $I_{KFH}$ may denote the blended image 267, $I_{boosted}$ may denote the brightened image 261 generated by the brightness booster 260 and $I_{KFM}$ may denote the key-feature image 263 generated by the key-feature estimator 262. The combiner 266 may combine the key-feature image 263 and the brightened image 261 according to:

$$I_{KFH} = I_{boosted} + I_{KFM}$$

The blended image 267 values may be mapped by a code-value mapper 268 to the range of display code values. The range of display code values may be [0,255]. The resulting KFH image 269 may be made available from the image-enhancement system 250 to an LCD display:

While the aforementioned techniques are suitable for brightening an image, the edges and/or details tend to be lost due to the tone scale manipulation of the image brightening process. In many applications, such as mobile displays, it is desirable to preserve edges and details during the image brightening process such that the brightened image maintains sufficient crispiness and contrast while having increased brightness to be readily readable at high ambient lighting conditions. In addition, temporal characteristics of video should be taken into account to reduce artifacts in a computationally efficient manner.

Figure 17:
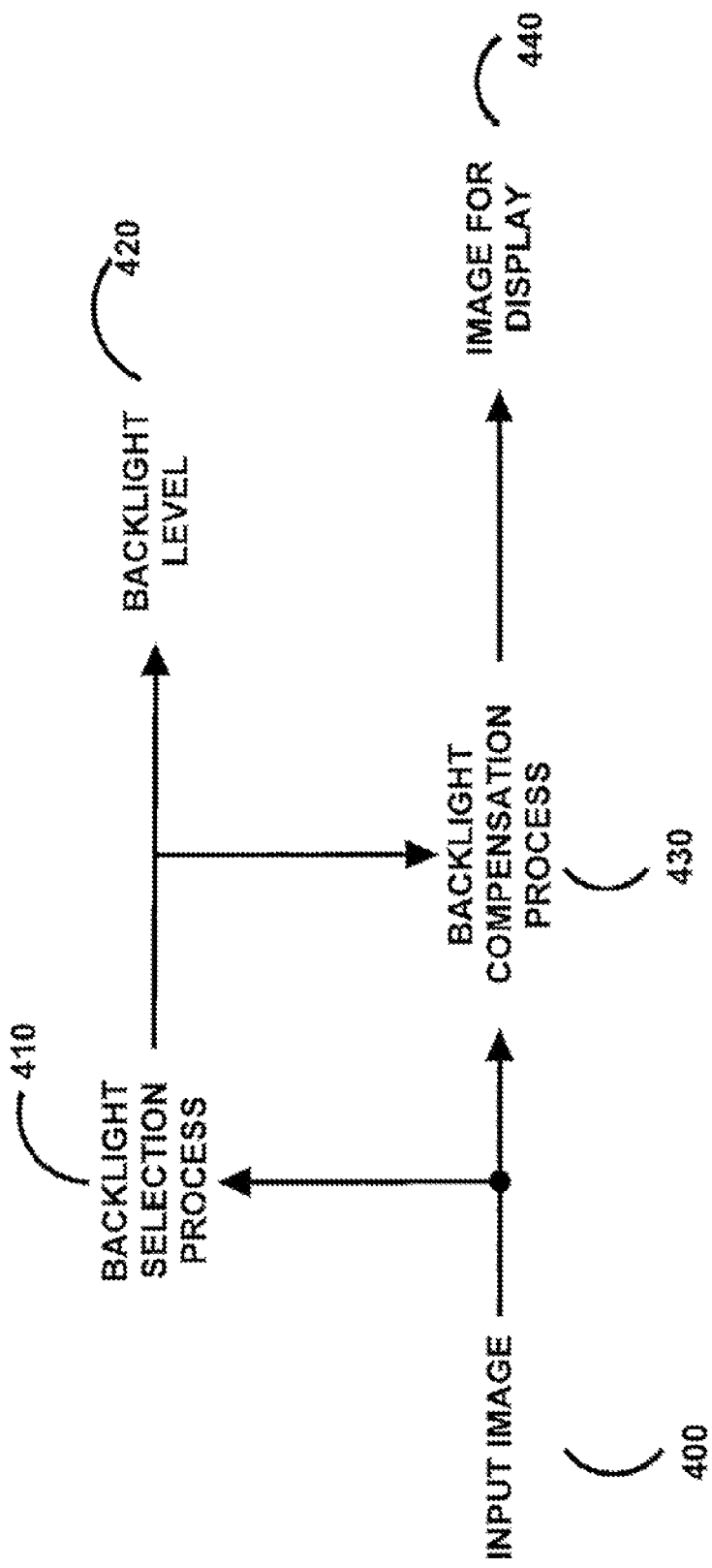
FIG. 17 illustrates an image enhancement technique.

Referring to FIG. 17, in general a liquid crystal based backlight modulation technique may receive an input image 400 as part of a video sequence. A backlight selection process 410 selects a backlight level 420 based, at least in part, on the content of the input image 400. The backlight level 420 may include global changes in the backlight level, local changes in the backlight level, color based changes in the backlight level, color space based changes in the backlight level, etc. The backlight selection process 410 thus selects the backlight level 420 suitable for the display. The input image 400 is modified based upon the backlight selection process 410 by a backlight compensation process 430. The backlight compensation process 430 provides an image for display 440.

Figure 18:
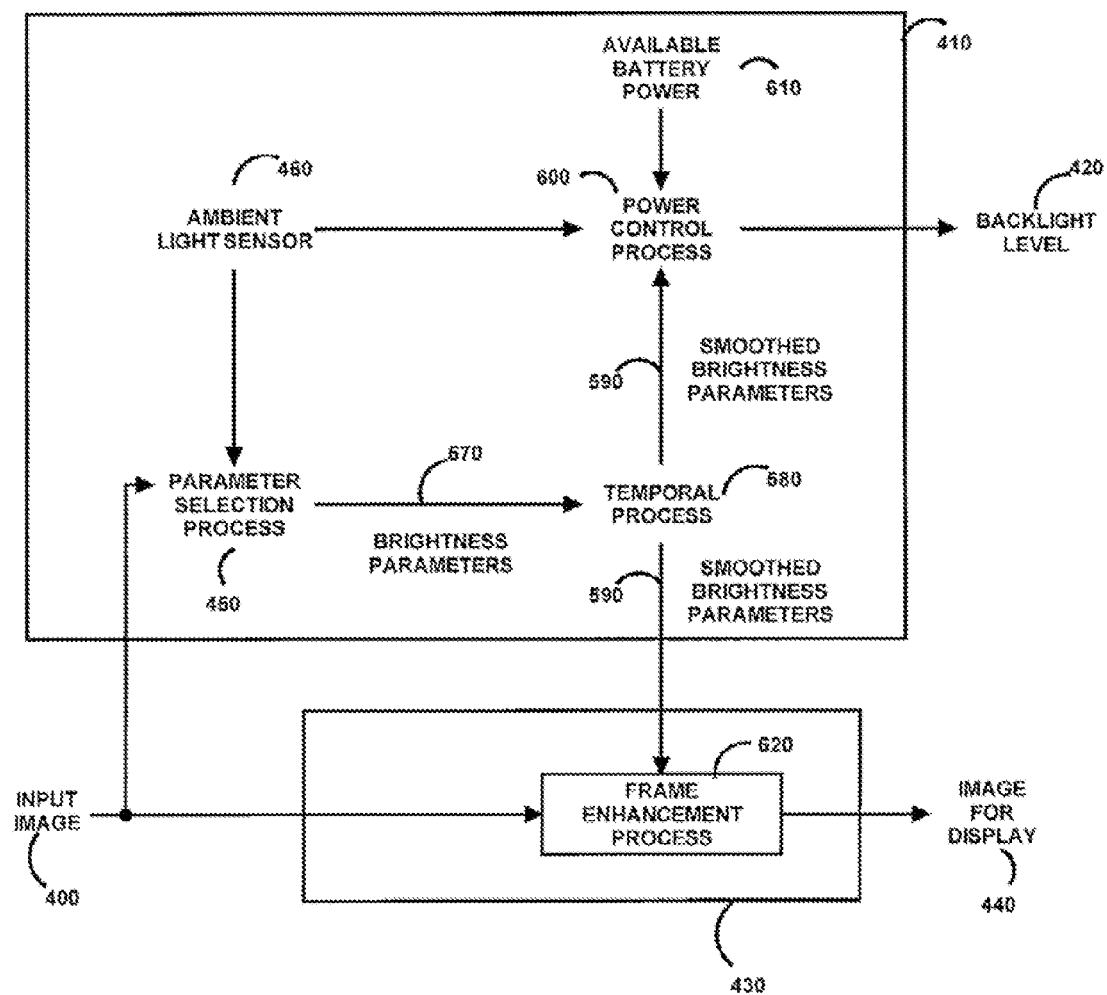
FIG. 18 illustrates a more detailed image enhancement technique.

Referring to FIG. 18, a more detailed liquid crystal based backlight modulation technique is illustrated. The input image 400 is received. The backlight selection process 410 may include a parameter selection process 450 that receives both the input image 400 and a signal from an ambient light sensor 460 that senses the ambient light levels proximate the display, such as in the proximity of a mobile phone. The parameter selection process 450 in response to its inputs provides one or more brightness parameters 570 generally related to a desirable backlight level. A temporal process 580 receives the brightness parameters 570 and temporally smoothes a series of received brightness parameters 570 to provide smoothed brightness parameters 590. In this manner, the temporal modulations of the brightness parameters are smoothed so that the brightness does not vary as quickly as it would otherwise, thus tending to reduce the artifacts that would otherwise result in a video. A power control process 600 receives the smoothed brightness parameters 590, which together with the signal from the ambient light sensor 460, and the available battery power 610 selects a suitable backlight level 420. The smoothed brightness parameter 590 may also be used by a frame enhancement process 620 that also receives the input image 400 to determine the image for display 440. The frame enhancement process 620 may include temporal smoothing of key features with motion compensation to reduce temporal artifacts.

Accordingly, the backlight selection process 410 and backlight compensation process 430 include three principal inputs, namely, the input image 400, the ambient light level sensed by the ambient light sensor 460, and the battery power 610. In this manner, the system uses the content of the image, the environmental conditions proximate the device, and the available power to select an appropriate backlight level, which is a significant factor related to the power consumption used by the device. In many cases, the smoothed brightness parameter 590 may be automatically selected and include a brightening factor and a blending factor based upon the image content and the ambient lighting conditions.

Figure 19:
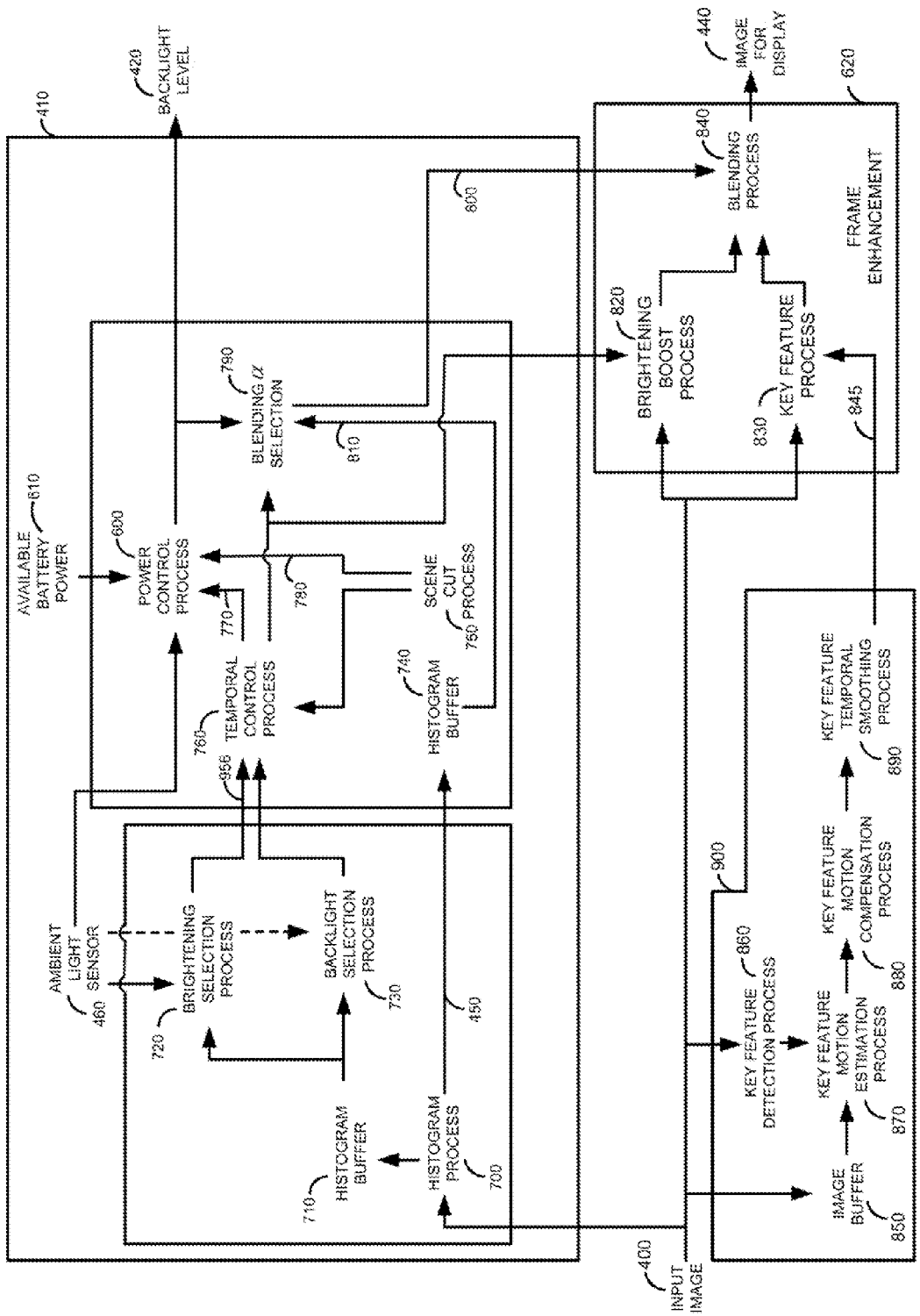
FIG. 19 illustrates a further more detailed image enhancement technique.

Referring to FIG. 19, a more detailed liquid crystal based backlight modulation technique is illustrated. The input image 400 is received. The parameter selection process 450 may include an image processing technique to characterize the image content in some manner, such as a histogram process 700. For example, the histogram process 700 may determine a color based characterization of the input image 400. A histogram buffer 710 may buffer a plurality of histograms 700, such as the histogram for the previous two frames of the input image 400 video based content. The histogram buffer 710 may provide one or more of the previous histograms to a brightening selection process 720 and a backlight selection process 730. The brightening selection process 720 and/or the backlight selection process 730 may be based upon the ambient light sensor 460 so that it is adaptive to the environmental conditions. The brightness selection process 720 may further be based upon the reflectivity of the display in combination with the brightness of the image content to determine the contrast ratio of the display. This contrast ratio of the display may be used as a basis to determine weights for different brightening to be applied to different image code values (e.g., luminance's) for the selection of a preferred brightening factor. The backlight selection process 730 may select among a set of potential backlight dimming values, preferably of a set of less than all available potential backlight dimming values, to determine a set of suitable backlight levels. Thus for each potential backlight dimming value, the effect of applying such a backlight value is determined. Preferably, the native display contract ratio, i.e., a dark room contrast, may be used to construct weights for a set of reduced level backlights. The histogram from the histogram buffer 710 may be used as a basis to determine a cost function for each reduced backlight level with the applied compensation, for the selection of a preferred backlight level.

The temporal process 580 may include a buffer to store temporal information of a plurality of frames of the video, such as a histogram buffer 740. The histogram buffer 740 may buffer a plurality of histograms 700, such as the histogram for the previous five frames of the input image 400. The content of the histogram buffer 740 may be used by a scene cut process 750 to determine the existence and location of a scene cut. The scene cut process 750 may be based upon any suitable technique, such as a histogram based correlation, as described in U.S. Ser. No. 11/948,978 filed Nov. 30, 2007 entitled Methods and Systems for Backlight Modulation With Scene-Cut Detection, incorporated by reference herein in its entirety. A temporal control process 760 preferably temporally smoothes the output of the brightening selection process 720. The temporal control process 760 also preferably temporally smoothes the output of the backlight selection process 730. The temporal control process 760 smoothes out the response of the brightening selection process 720 and/or backlight selection process 730 to reduce artifacts in the resulting video content, especially video content with significant changes in brightness levels. The brightness levels and/or backlight selection should not similarly be smoothed in the same manner across a scene cut because the change in the brightness of the image is more likely to change more abruptly. Therefore the temporal control process 760 likewise preferably modifies the smoothing based upon the output of the scene cut process 750, such as only smoothing to either side of the scene cut.

The temporal control process provides a brightening factor 770 that is provided to the power control process 600. The brightening factor 770 is based upon temporal characteristics which helps smooth out the backlight. The scene cut process 750 may also provide a scene cut flag 780 indicating the location of a scene cut. The scene cut flag 780 is likewise based upon temporal characteristics, but rather indicates locations in the video of scene cuts, which assists in the temporal control process allowing large changes in brightening/backlight when a scene cut is detected. The power control process 600, based upon the brightening factor 770, the output of the ambient light sensor 460, the scene cut flag 780, and/or the available battery power 610, provides a signal indicating a suitable backlight level 420 for the display.

A blending a selection process 790 uses the output of the temporal control process 760, namely a brightening factor 810, to select a blending factor 800 that is used with the frame enhancement process 620, which provides some temporal characteristics. The blending a selection process 790 may also used the backlight level 420 as an input in selecting the blending factor 800, which provides an input based upon other factors, such as the ambient light level and/or available battery power 610. The blending factor 800 provides an indication of the selection of image for display 440 among different characteristics of the input image 400.

The brightness compensation process 430 may include a brightening boost process 820 that selectively increases the luminance of the input image 400 based upon the brightening factor 810. If the image is indiscriminately boosted, the edge details of the image may be lost. The brightness compensation process 430 may include a key feature process 830 that identifies key features of the input image 400, such as those regions of the image that include edge based features. The key features identify those features of interest to the viewer that are likely to be lost in the brightening boost process 820. The key feature process 830 may include a key feature temporal smoothing input 845 to make adjustments to the key features based upon motion compensation. A blending process 840 may determine the image for display 440 based upon the blending factor 800 used to select the amount of the image from the brightening boost process 820 and the image from the key feature process 830. For example, the blending factor 800 may select a of the brightening boost process 820 and select I-a of the key feature process 830.

The key feature input 840 may be determined based upon a key feature system 900. The key feature system 900 may include a key feature motion estimation process 870 to determine key features of a series of the input images 400 using a key feature detection process 860 and an image buffer 850. A key feature motion compensation process 880 receives the output of the key feature motion estimation process 870 to compensate for the motion of the key features. A key feature temporal smoothing process 890 smoothes out the key features 880 over a series of frames to provide motion compensated key features 845.

Figure 20:
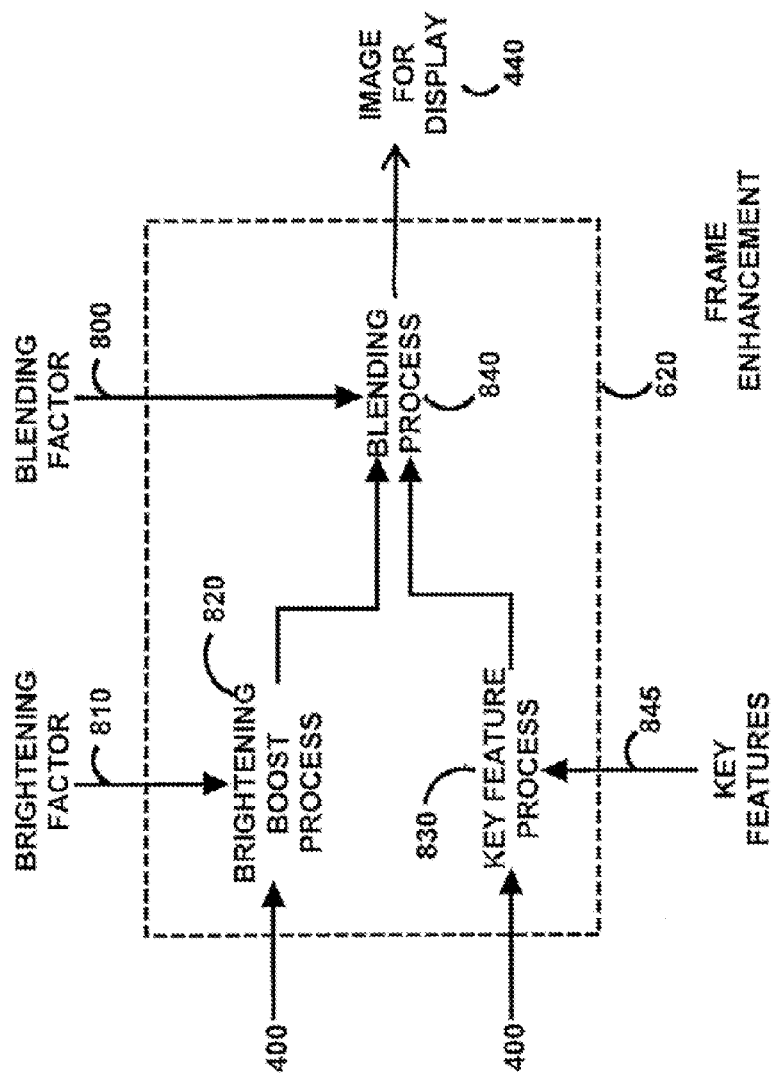
FIG. 20 illustrates a frame enhancement technique.

Referring to FIG. 20, a selected portion of the system of FIG. 19 is illustrated for increased clarity. Of particular interest is the ability to achieve good viewing of the display under low contrast conditions, such as high ambient light and/or when a device is operating using a power savings mode for the backlight. For the frame enhancement technique 620 the principal inputs are the brightening factor 810 and the blending factor 800, which should be selected in a manner suitable for video rates with limited computational resources.

As previously described, the brightening factor 810 may be selected based upon the image content, the ambient light level, display reflectivity, and/or display contrast ratio. The ambient light level, the display reflectivity, and/or display contrast ratio may be used to determine the available contrast range that may be effectively used by the display. Increased brightening affects the image that is displayed by elevating the brightness of each pixel (or a selected set). The effect of brightening is different for the lower luminance pixel values as opposed to the higher luminance pixel values. For the higher luminance pixel values, increasing of the brightening value increases the likelihood of clipping the pixel values at the display maximum. The resultant clipping looses detail in the image and may result in a color shift if one color component of a pixel is clipped to a greater extent than another color component of the pixel.

The image for display 440 may be determined based upon a relationship, such as $I_i^{output} = (1-\alpha) \cdot I_i \propto \cdot G_i$, where $I_i^{output}$ is the $i^{th}$ pixel of the image for display 440, $I_i$ is the result of the brightening boost process 820 based upon the brightening factor 810, or is the blending factor 800, and GL is the result of the key feature process, preferably based upon image gradients. Accordingly, as the blending factor 800 increases the more pronounced the highlighted edge effects become in the image for display 400.

The selection of the brightening factor 810 may be based on selecting a backlight level so that the result of the backlight dimming and image processing reduces the distortion between an ideal display and the combined result of modifying the image and dimming the backlight. A set of power distortion clipping points may be selected, such as:

$$x_{low}(P) = cv\text{Max} \cdot \left(\frac{P}{CR}\right)^{\frac{1}{\gamma}} \quad x_{high}(P) = cv\text{Max} \cdot (P)^{\frac{1}{\gamma}},$$

where CR is the display native contrast ratio, gamma is the display gamma parameter (typically 2.2), P is the relative backlight power, and cvMax is the maximum image code value (typically 255).

Figure 21:
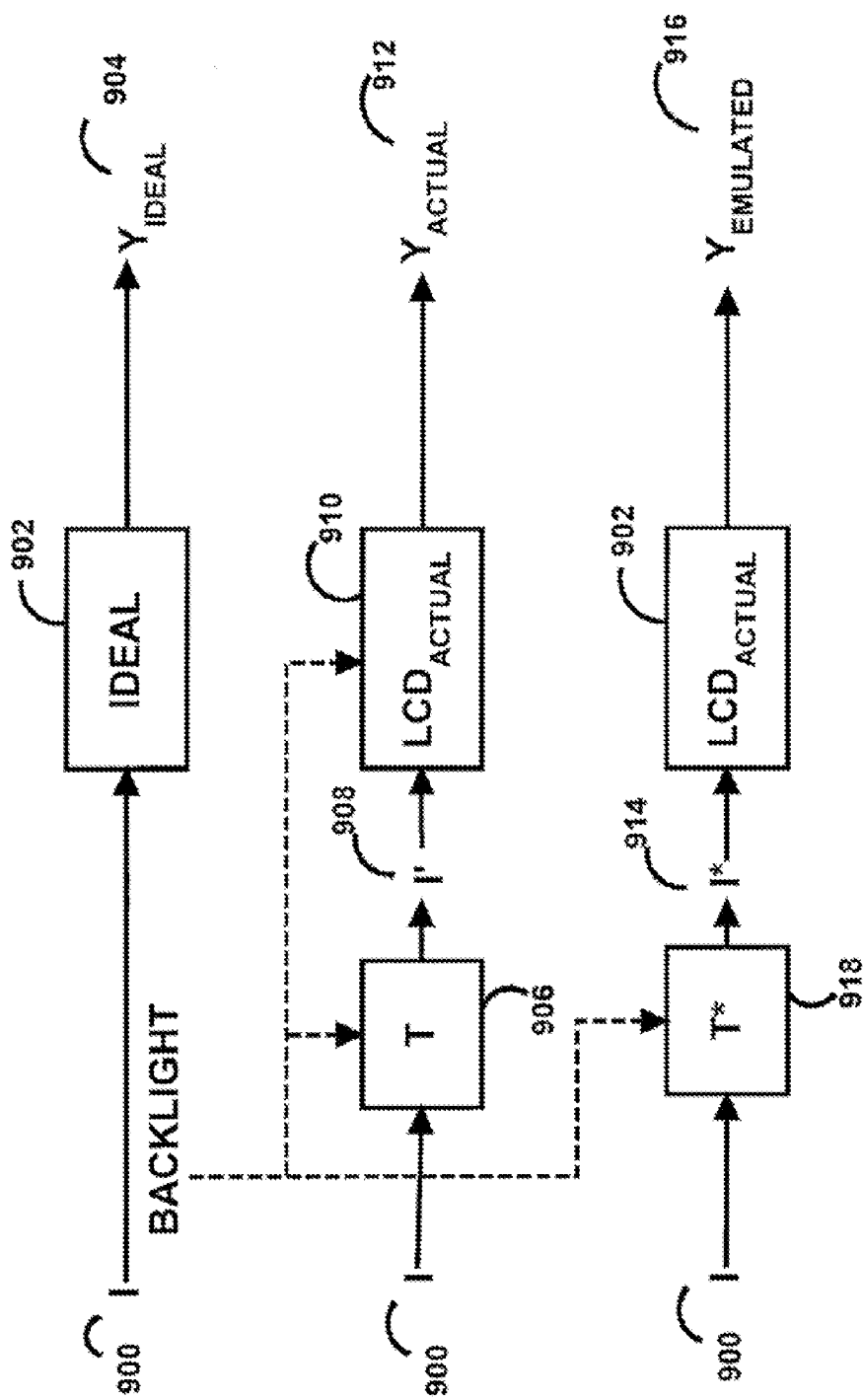
FIG. 21 illustrates related images and displays.

To illustrate a technique for calculating the distortion calculations, referring to FIG. 21, an image I 900 may be used as input in creating each of these exemplary modified images. In some embodiments, an original input image 900 may be processed 902 to yield an ideal output, $Y_{ideal}$ 904. The ideal image processor, a reference display 902 may assume that the ideal display has a zero black level. This output, $Y_{Ideal}$ 904 may represent the original image 900 as seen on a reference (Ideal) display. In some embodiments, assuming a backlight level is given, the distortion caused by representing the image with this backlight level on the actual LCD may be computed.

In some embodiments, a brightness preservation module 906 may be used to generate an image I' 908 from the image I 900. The image I' 908 may then be sent to the actual LCD processor 910 along with the selected backlight level. The resulting output is labeled Yactual 912.

The reference display model may emulate the output of the actual display by using an input image I* 914 using a brightness preservation 918.

The output of the actual LCD 910 may be the result of passing the original image I 900 through the luminance matching tone scale function 906 to get the image I' 908. This may not exactly reproduce the reference output depending upon the backlight level. However, the actual display output can be emulated on the reference display 902. The image I* 914 denotes the image data sent to the reference display 902 to emulate the actual display output, thereby creating $Y_{emulated}$ 916. The image I* 914 is produced by clipping the image I 900 to the range determined by the clipping points defined above. In some embodiments, I* may be described mathematically as:

$$I^*(cv, P) = \begin{cases} x_{low}(P) & cv \leq x_{low}(P) \\ cv & x_{low}(P) < cv < x_{high}(P) \\ x_{high}(P) & x_{high}(P) \leq cv \end{cases}$$

In some embodiments, distortion may be defined as the difference between the output of the reference display with image I and the output of the actual display with backlight level P and image I'. Since image I* emulates the output of the actual display on the reference display, the distortion between the reference and actual display equals the distortion between the images I and I* both on the reference display.

$$D(Y_{Ideal}, Y_{Actual}) = D(Y_{Ideal}, Y_{Emulated})$$

Since both images are on the reference display, the distortion can be measured between the image data only not needing the display output.

$$D(Y_{Ideal}, Y_{Actual}) = D(I, I^*)$$

The analysis above shows the distortion between the representation of the image I 900 on the reference display and the representation on the actual display is equivalent to the distortion between that of images I 900 and I* 914 both on the reference display. In some embodiments, a pointwise distortion metric may be used to define the distortion between images. Given the pointwise distortion, d, the distortion between images can be computed by summing the difference between the images I and I*. Since the image I* emulates the luminance match, the error consists of clipping at upper and lower limits. In some embodiments, a normalized image histogram h(x) may be used to define the distortion of an image versus backlight power.

$$D(I, I^*) = \sum_x d(x, T^*(x, P))$$

$$D(I, P) = \sum_{x < cv_{low}(P)} \tilde{h}(x) \cdot d(x - cv_{low}(P)) + \sum_{x > cv_{high}(P)} \tilde{h}(x) \cdot d(x - cv_{high}(P))$$

Figure 22:
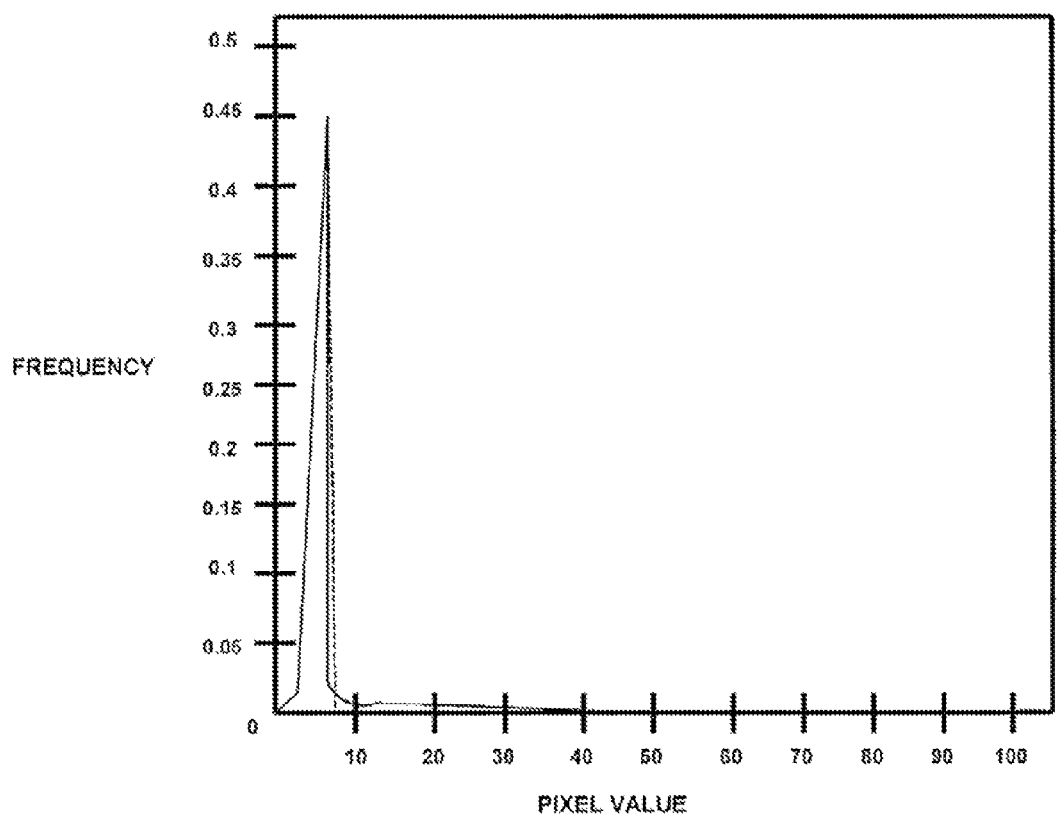
FIG. 22 illustrates code value histogram.

Given a reference display, actual display, distortion definition, and image, the distortion may be computed at a range of backlight levels. When combined, this distortion data may form a backlight vs. distortion curve. A backlight vs. distortion curve may be illustrated using a sample frame, which is a dim image of a view looking out of a dark closet, and an ideal display model with zero black level, an actual LCD model with 1000:1 contrast ratio, and a Mean Square Error MSE error metric. FIG. 22 is a graph of the histogram of image code values for an exemplary image.

Figure 23:
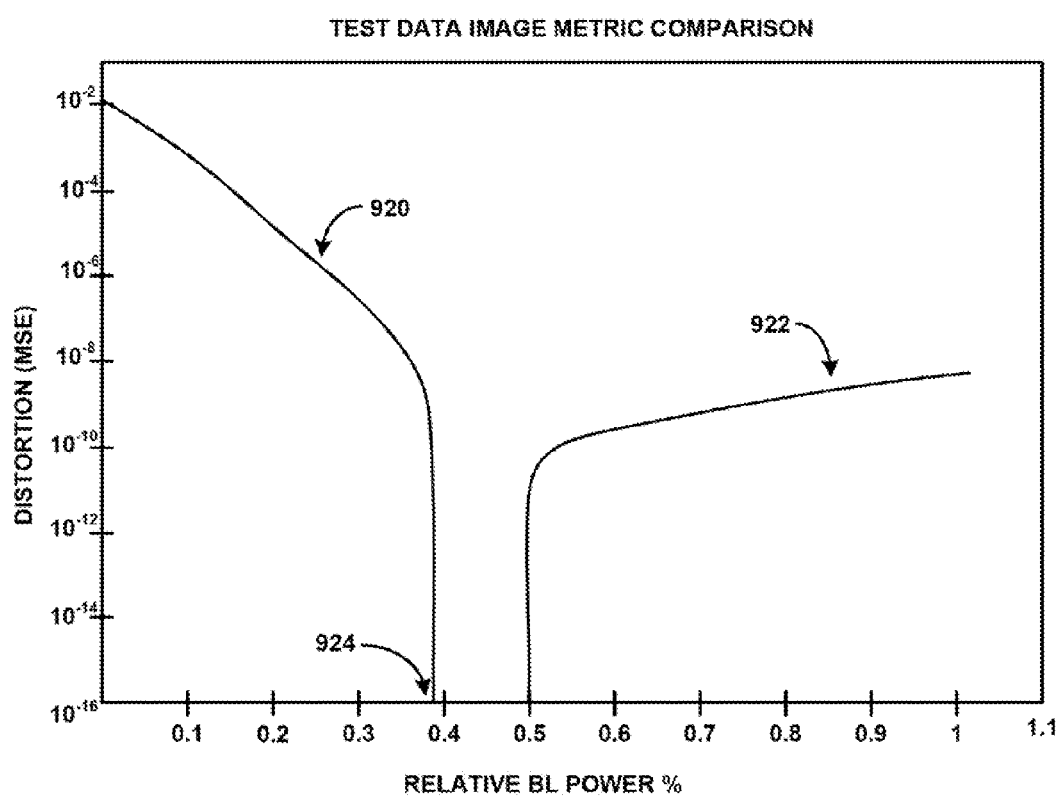
FIG. 23 illustrates minimum distortion backlight determination.

In some embodiments, the distortion curve may be computed by calculating the distortion for a range of backlight values using a histogram. FIG. 23 is a graph of an exemplary distortion curve corresponding to the histogram of FIG. 22. For an exemplary image, at low backlight values, the brightness preservation is unable to effectively compensate for the reduced backlight resulting in a dramatic increase in distortion 920. At high backlight levels, the limited contrast ratio causes the black level to be elevated 922 compared to the ideal display. A minimum distortion range exists and, in some embodiments, the lowest backlight value giving this minimum distortion 924 may be selected by the minimum distortion algorithm.

Figure 24:
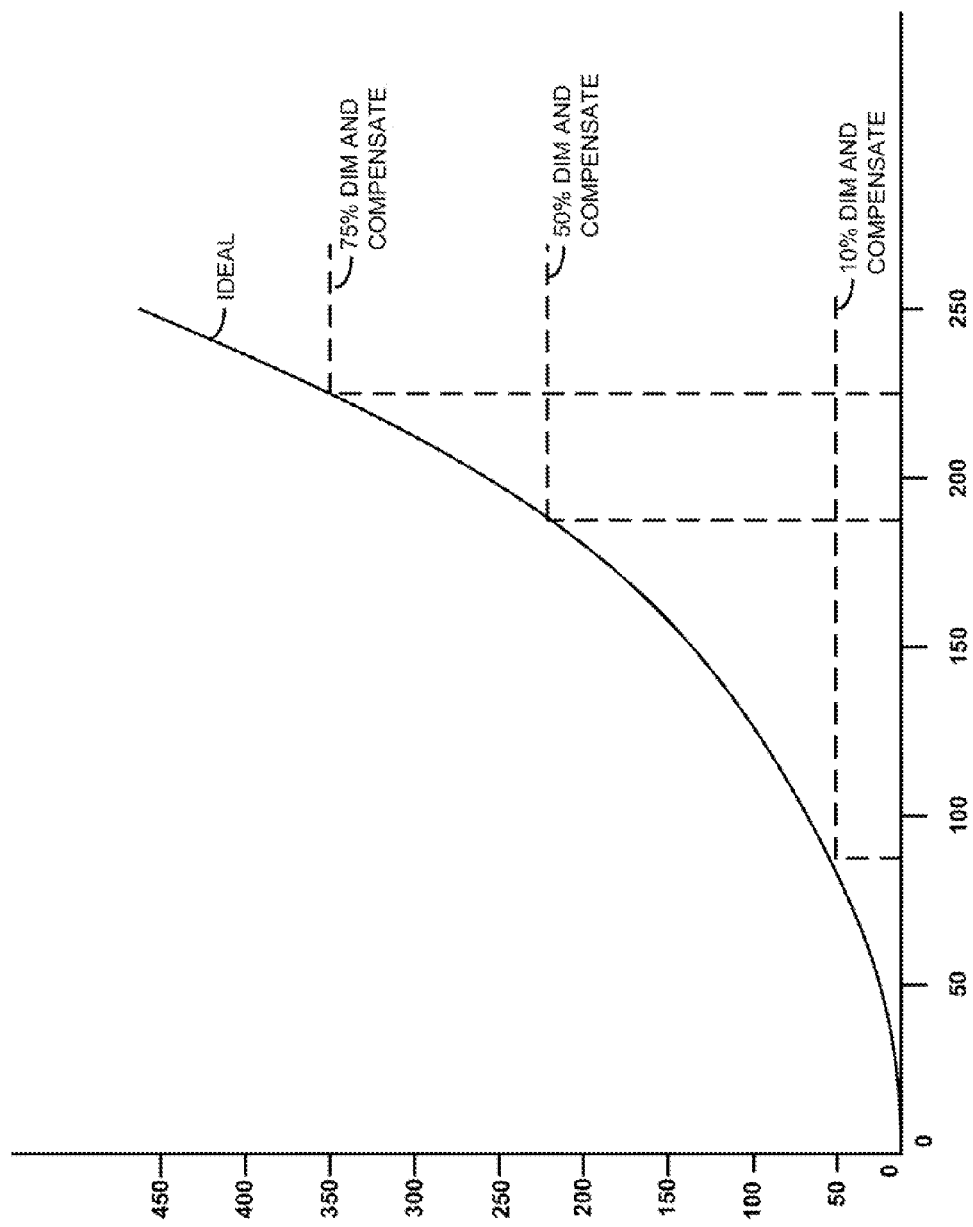
FIG. 24 illustrates backlight dimming and pixel compensation.

An aspect of the backlight selection technique includes a distortion cost function based on the distortion between an ideal image and a modified image presented at a given backlight level. The image modification technique adequately compensates for the backlight dimming except for the two limits, namely, (1) the maximum output is limited by the selected backlight level and (2) the minimum level is limited by the selected backlight level and the LCD native contract ratio. These two limits may be expressed in the parameters $x_{low}(P)$ and $x_{high}(P)$, and may be used to derive the distortion measured used to select the improved backlight level. These limits may depend only upon the power level P and the display native contrast ratio CR. These limits correspond to selecting an operating range having a width corresponding to the native contrast ratio of the LCD on the ideal display curve. Changing the backlight level may be interpreted as sliding along this ideal display curve. Pixels with values that are not clipped during the image processing are represented with the same amount of light as they would be on the ideal display. Referring to FIG. 24, an illustration of how the low and high clipping points change with the power percentage is shown.

The matching of pixel compensation and backlight dimming in the backlight selection results in the dimmed backlight display output following a fixed curve as dimming is applied and compensated for with the exception of clipping. The backlight level is adjusted based on the image content to control the degree of clipping. The property of display output following a fixed curve when backlight dimming and pixel compensation are used together does not hold in the selection of the brightening factor. In this situation, the maximum brightness of the display, backlight level for the LCD, is held fixed while different brightening factors are considered. Additionally, there is a lower limit provided to the technique which corresponds to the lower limit of display contrast under the ambient lighting and display reflectivity. The brightening factor selection process does not compare an ideal display output and an alternative output to compute the distortion. If that were done, the optimal brightening factor would be unity, i.e., no modification. The two brightening factors result in non-overlapping display output unlike the backlight selection and compensation process previously described in relation to FIG. 24.

Figure 25:
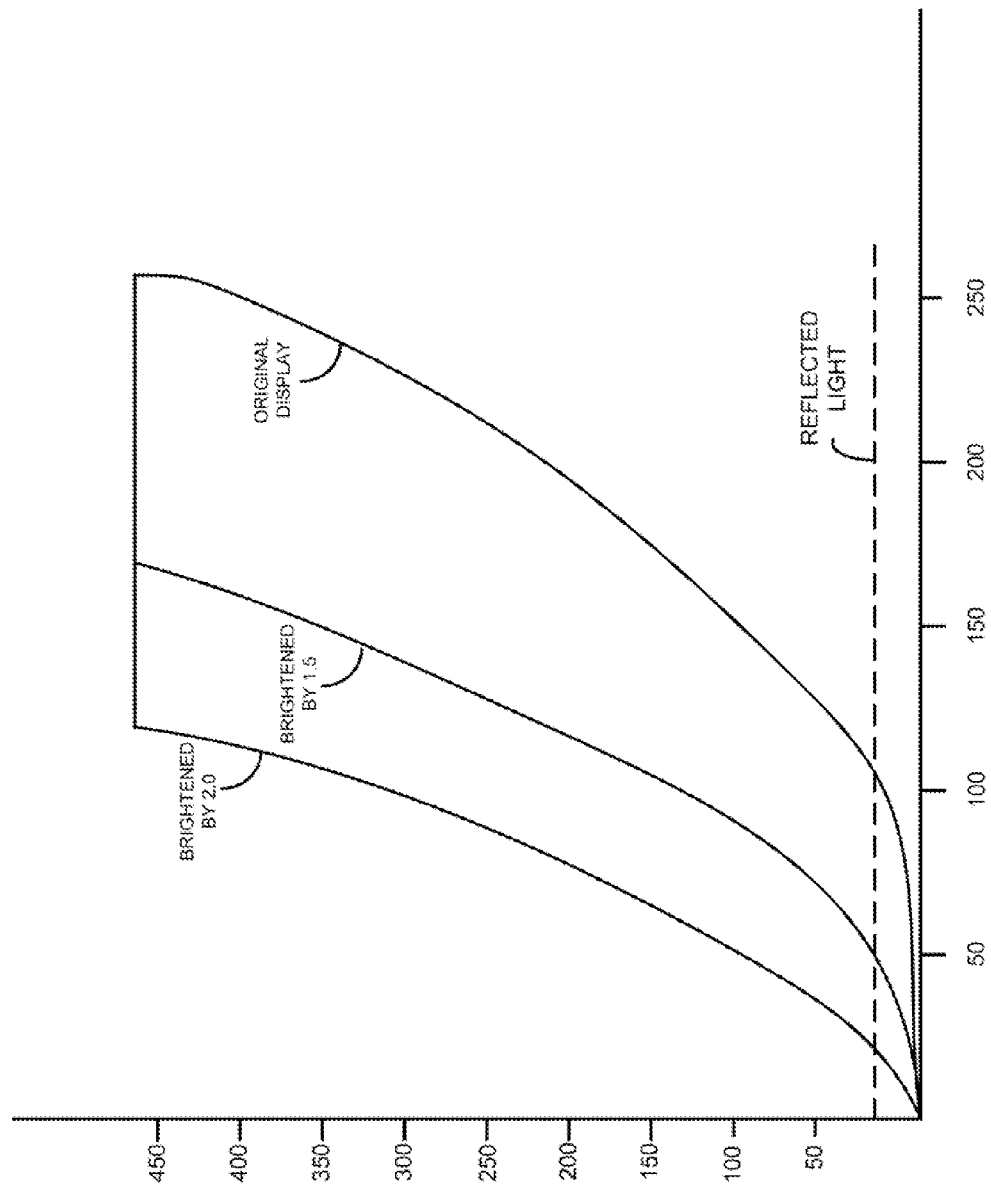
FIG. 25 illustrates brightening factor performance.
Figure 26:
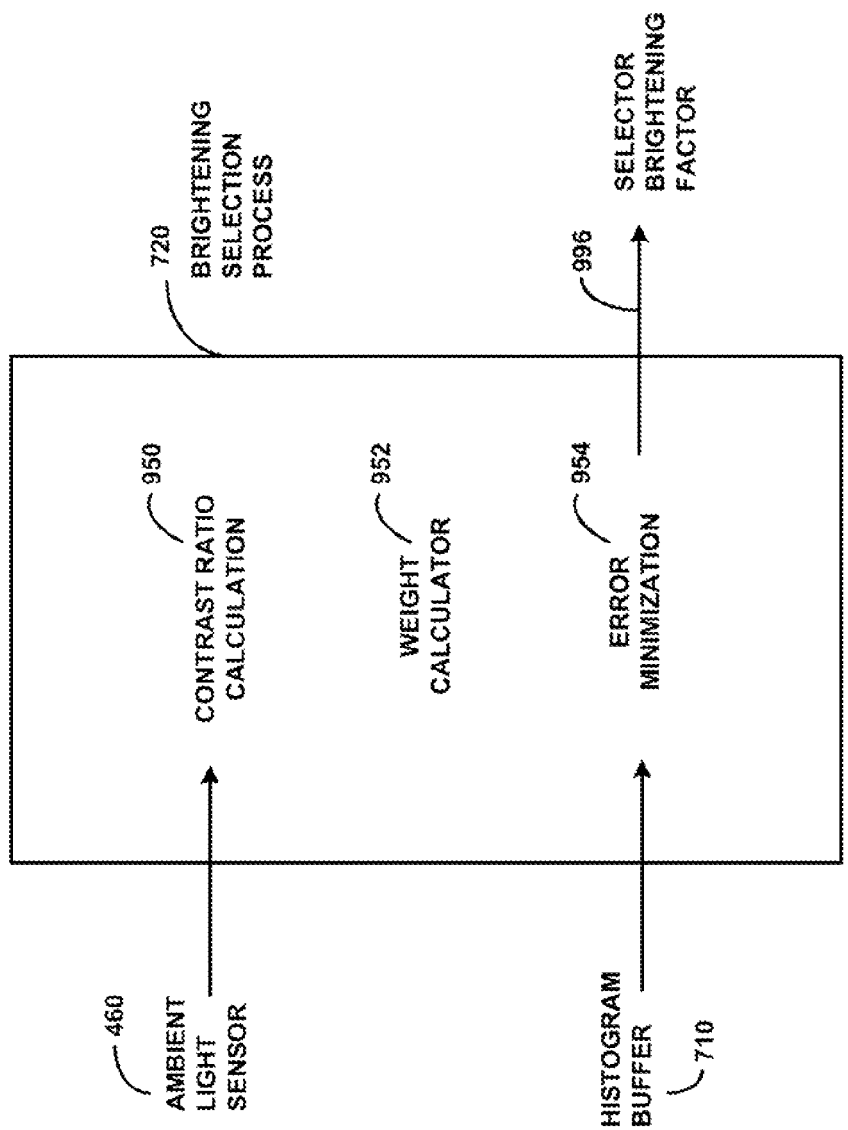
FIG. 26 illustrates a brightening factor selection process.

Referring to FIG. 25, a comparison of different brightening factors with an original display and an amount of reflected ambient light are shown. The original image corresponds to a brightening factor of 1.0. It is noted that as the brightening factor is increased, the bright regions of the image are clipped at the maximum of the original display while the dark regions are elevated about the level of reflected light.

In the backlight selection process, the clipping limits were described in relation to the code value domain. In that case, the upper clipping point depends only upon the backlight level while the lower clipping point depends on both the backlight level and the display native contrast ratio and gamma parameter. In the brightening factor selection, the corresponding clipping points are most easily described in the linear light domain. The high clipping factor is given by the display maximum. The low clipping factor is determined by the reduction in contrast due to reflected ambient light. One criterion to select this low clipping factor is when the light reflected from the display equals the amount of light emitted by a pixel value. In this case, the lower clipping limit is simply the product of the ambient light level and the display reflectivity.

$$Y_{low}(ambient, reflectiviy) = ambient \cdot reflectivity \cdot Y_{high} = DisplayMax$$

Using the display gamma factor these can be converted into code value clipping levels. The maximum is simple to convert since it is merely the largest code value. The minimum is convened using the display gamma:

$$cv_{low}(\text{ambient, reflectivity}) = (\text{ambient} \cdot \text{reflectivity})^{\frac{1}{\gamma}}$$
$$cv_{high} = \text{Max}CV$$

These clipping limits apply to a generic image. If the image is the result of applying a brightening factor B to an image, the clipped code value limits are modified to account for the brightening factor as $$cv_{low}(\text{ambient, reflectivity, } B) = \frac{(\text{ambient} \cdot \text{reflectivity})^{\frac{1}{\gamma}}}{B}$$
$$cv_{high}(B) = \frac{\text{Max}CV}{B}$$

The display reflectivity is typically set by the manufacturing process. The ambient light level can be measured using a sensor and weighted by the known reflectivity and inverse gamma computed to give a single parameter A. The clipping points may then determined by the parameters A and B by the rule:

$$cv_{low}(A, B) = \frac{A}{B}$$
$$cv_{high}(B) = \frac{\text{Max}CV}{B}$$

The clipping factors can be used to define a distortion function by calculating the amount of clipping in the code value domain.

$$D(I, A, B) = \sum_{x<cv_{low}(A,B)} \tilde{h}(x) \cdot d(x - cv_{low}(A, B)) + \sum_{x>cv_{high}(B)} \tilde{h}(x) \cdot d(x - cv_{high}(B))$$

Figure 27:
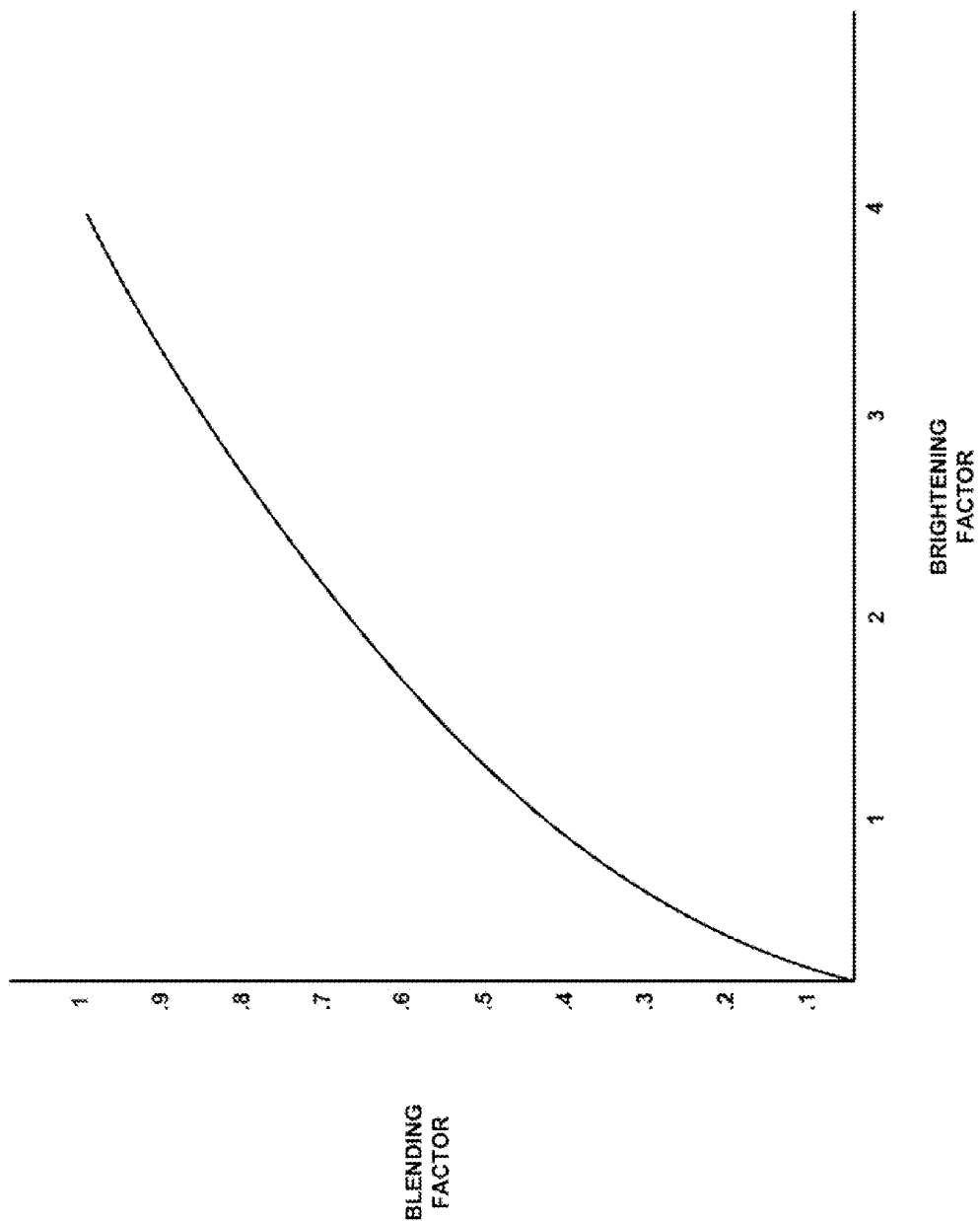
FIG. 27 illustrates a brightening factor versus blending factor curve.

The brightening factor distortion can be recognized as a weighted sum of the image histogram where the weights are computed using the ambient and brightening factors A and B. Given an ambient level from the ambient light sensor 460 and an image histogram 710, minimization of this brightening factor distortion can be used to select the brightening factor. This process is illustrated in FIG. 27. In this process, the ambient light level is sensed by the ambient light sensor 460. The contrast ratio 950 may be calculated using the display reflectivity with the ambient light levels to compute weights 952 used by the distortion function 954. The weights and image histogram define a distortion function for each brightening factor. Minimization of this distortion yields the selected brightening factor 956. Given an image, as the ambient factor increases, the degree of brightening is increased.

In one embodiment, blending factor α monotonously increases as the brightening factor increases. This is driven by the fact that, when brightening factor is large, image details will be lost on flat, textured area, in this case, enforcing large blending factor will compensate the loss of the details through retaining key object structures such as contours and edges.

The relationship between brightening factor and blending factor can be captured by:

$$\alpha = T \Box \beta^r$$

where α is the blending factor, T is a constant that normalizes blending factor to the range of [0 1], β is the brightening factor selected by the automatic brightening factor selection algorithm, r controls how fast α grows as β increases. One embodiment of this curve is shown in FIG. 27.

Figure 28:
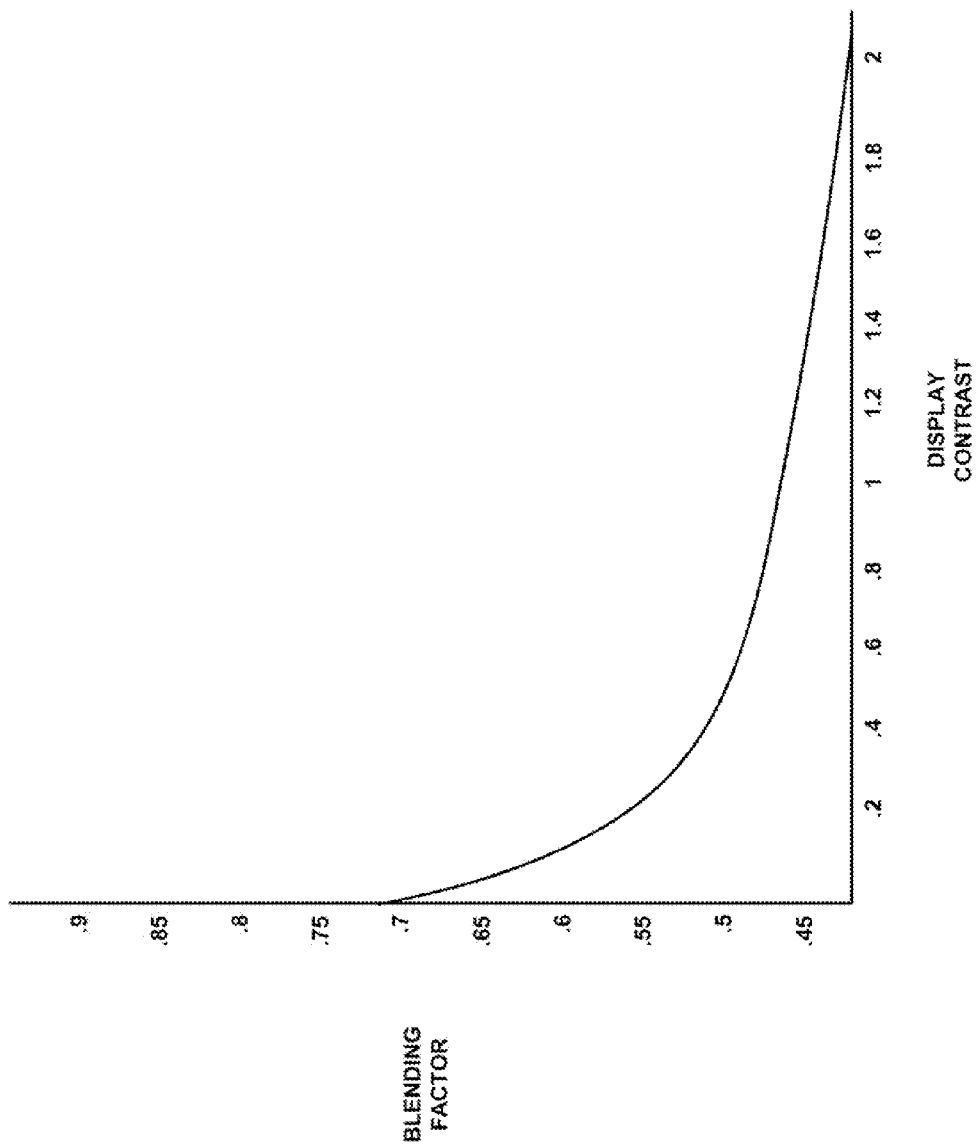
FIG. 28 illustrates a relationship between display contrast and a blending factor.

In another embodiment, blending factor α depends on the display contrast. The larger the display contrast, the smaller the blending factor. Their relationship can be captured by:

$$\alpha = TC^{(-r)}$$

where α is the blending factor, T is a constant that normalizes blending factor to the range of [0 1], C is the display contrast ratio, r is the decay rate which controls how fast a decay as C increases, r is positive, and its value depends on the range of the display contrast ratio. FIG. 28 shows one embodiment of a display contrast-blending factor curve.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A computer-implemented method for enhancing an input image for a display comprising:
    (a) receiving an input image;
    (b) modifying said input image for being displayed on said display based upon temporal artifact characteristics of a sequence of said input images;
    (c) modifying a backlight level of said display based upon a signal from an ambient light sensor and content of said input image; and
    (d) receiving a plurality of brightness parameter selections based on the modified said backlight level and temporally smoothing said brightness parameter selections to determine a smoothed brightness parameter selection.

2. The method of claim 1 wherein said modified backlight level includes different modifications to different portions of a backlight of said display.

3. The method of claim 1 wherein said input image is modified based upon said modified backlight level.

4. The method of claim 1 further comprising a power control process receiving said smoothed brightness parameter selection.

5. The method of claim 4 wherein said power control process receiving said signal from said ambient light sensor.

6. The method of claim 5 wherein said power control process receiving a signal indicating available battery power.

7. The method of claim 6 wherein said power control process provides a signal indicating said backlight level.

8. The method of claim 1 wherein said modifying said input image is based upon said smoothed brightness parameter selection.

9. The method of claim 1 wherein said modification of said input image is based upon identified edge features.

10. The method of claim 1 wherein said brightness parameter selection is further based upon the reflectivity of said display.

11. The method of claim 9 wherein said brightness parameter selection is further based upon the contract ratio of said display.

12. The method of claim 11 wherein said contrast ratio is used to select among a set of potential backlight dimming values.

13. The method of claim 12 wherein said potential backlight dimming values are less than all potential backlight dimming values.

\* \* \* \* \*

UNITED STATES PATENT AND TRADEMARK OFFICE
CERTIFICATE OF CORRECTION

| | | |
|---|---|---|
| PATENT NO. | : 8,761,539 B2 | Page 1 of 1 |
| APPLICATION NO. | : 13/545457 | |
| DATED | : June 24, 2014 | |
| INVENTOR(S) | : Louis Joseph Kerofsky et al. | |

It is certified that error appears in the above-identified patent and that said Letters Patent is hereby corrected as shown below:

In the Claims

Col. 17, Line 1

Change "The method of claim 9" to read --The method of claim 10--.

Signed and Sealed this

Second Day of December, 2014

Michelle K. Lee
*Deputy Director of the United States Patent and Trademark Office*